United States Patent [19]

Kawaguchi et al.

[11] Patent Number: 5,448,024
[45] Date of Patent: Sep. 5, 1995

[54] DISPLAY-INTEGRATED TYPE TABLET DEVICE WITH HIGH COORDINATE DETECTION ACCURACY AND METHOD FOR DRIVING THE SAME

[75] Inventors: Takafumi Kawaguchi, Yamatotakada; Akira Tomiyoshi; Makoto Takeda, both of Nara, all of Japan

[73] Assignee: Sharp Kabushiki Kaisha, Osaka, Japan

[21] Appl. No.: 236,359

[22] Filed: Apr. 29, 1994

[30] Foreign Application Priority Data

Apr. 30, 1993 [JP] Japan .................. 5-104100
Apr. 30, 1993 [JP] Japan .................. 5-104830

[51] Int. Cl.[6] .................. G08C 21/00; G09G 3/02
[52] U.S. Cl. .................. 178/18; 178/19; 345/156; 345/179; 345/182
[58] Field of Search .................. 178/18, 19; 345/156, 345/174, 175, 179, 182

[56] References Cited

U.S. PATENT DOCUMENTS

| | | | |
|---|---|---|---|
| 4,617,515 | 10/1986 | Taguchi ................ | 178/19 |
| 4,646,073 | 2/1987 | Fukunaga ............. | 345/179 |
| 4,839,634 | 6/1989 | More et al. ........... | 178/19 |
| 4,988,837 | 1/1991 | Murakami ............. | 178/18 |
| 4,989,040 | 1/1991 | Matsuo ................. | 178/18 |
| 4,992,630 | 2/1991 | Mletzko ................ | 178/18 |
| 5,194,852 | 3/1993 | More et al. ........... | 178/19 |
| 5,266,750 | 11/1993 | Yatsuzuka .............. | 345/174 |
| 5,270,711 | 12/1993 | Knapp .................. | 345/174 |

FOREIGN PATENT DOCUMENTS

| | | |
|---|---|---|
| 0375328 | 6/1990 | European Pat. Off. . |
| 0504728A2 | 9/1992 | European Pat. Off. . |
| 3-294919 | 12/1991 | Japan . |
| 4-283819 | 10/1992 | Japan . |

OTHER PUBLICATIONS

Patent Abstract of Japan, vol. 16, No. 525 (P-1446), Oct. 28, 1992.

*Primary Examiner*—Stephen Chin
*Assistant Examiner*—Vijay Shankar
*Attorney, Agent, or Firm*—David G. Conlin; Kevin J. Fournier

[57] ABSTRACT

A switching circuit selects a display control circuit in an image display period, and selects a detection control circuit in an x-coordinate detection period. A row electrode drive circuit outputs row electrode scanning pulses in the image display period to sequentially scan row electrodes. A column electrode drive circuit outputs column electrode scanning pulses in the x-coordinate detection period to sequentially scan column electrodes. A coordinate detection circuit detects coordinates at a tip end of a detection pen based on an induction voltage induced at a tip electrode of the detection pen due to the scanning pulses. Accordingly, by detecting a y-coordinate at the tip end of the electronic pen in the image display period and detecting the x-coordinate in the x-coordinate detection period, a display-integrated type tablet device can achieve an increase in area of its display screen, high productivity, cost reduction, and high coordinate detection accuracy.

27 Claims, 14 Drawing Sheets

Fig.6
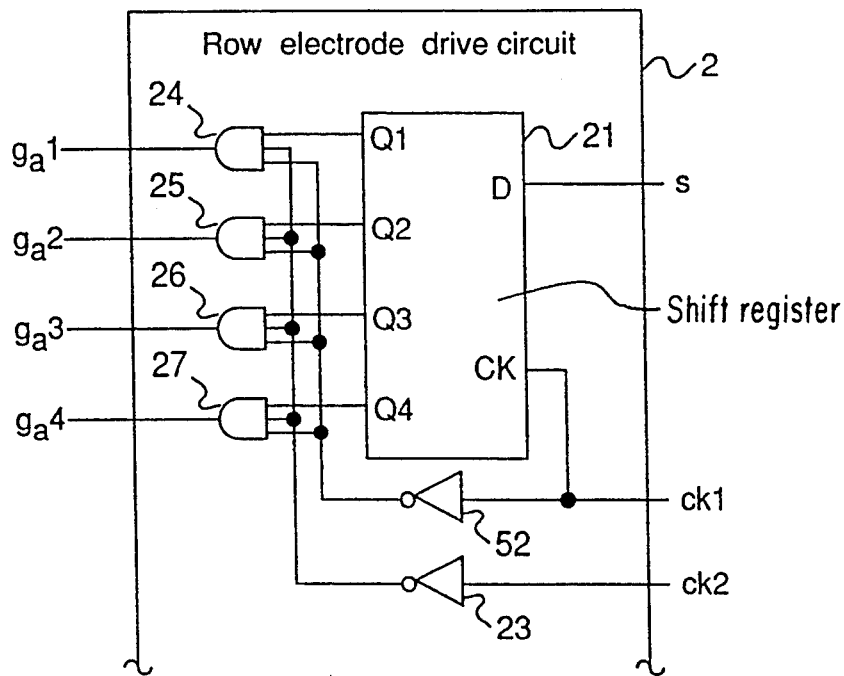
Shift data signal s
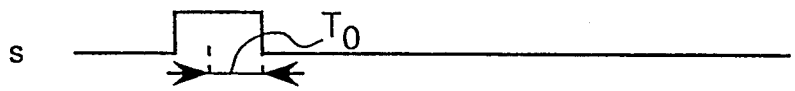
FIG. 7A
First clock signal ck1
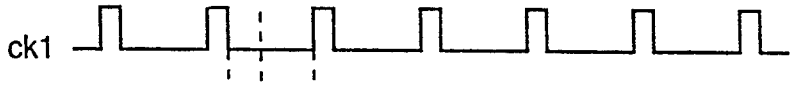
FIG. 7B
Second clock signal ck2
FIG. 7C
Row electrode scanning signal
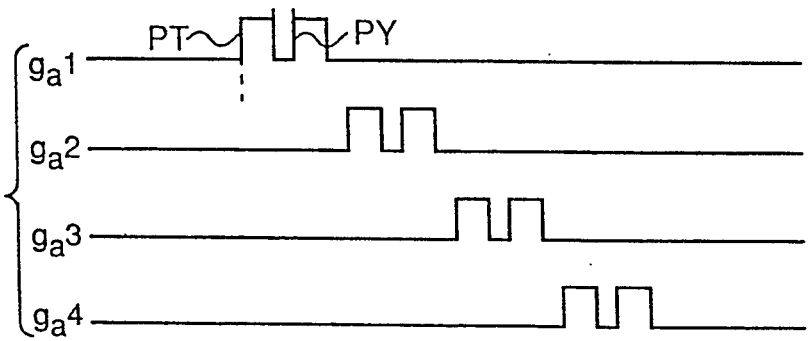
FIG. 7D Horizontal sync signal Change of reference voltage of column electrode drive signal S1

Detection signal

Reference voltage

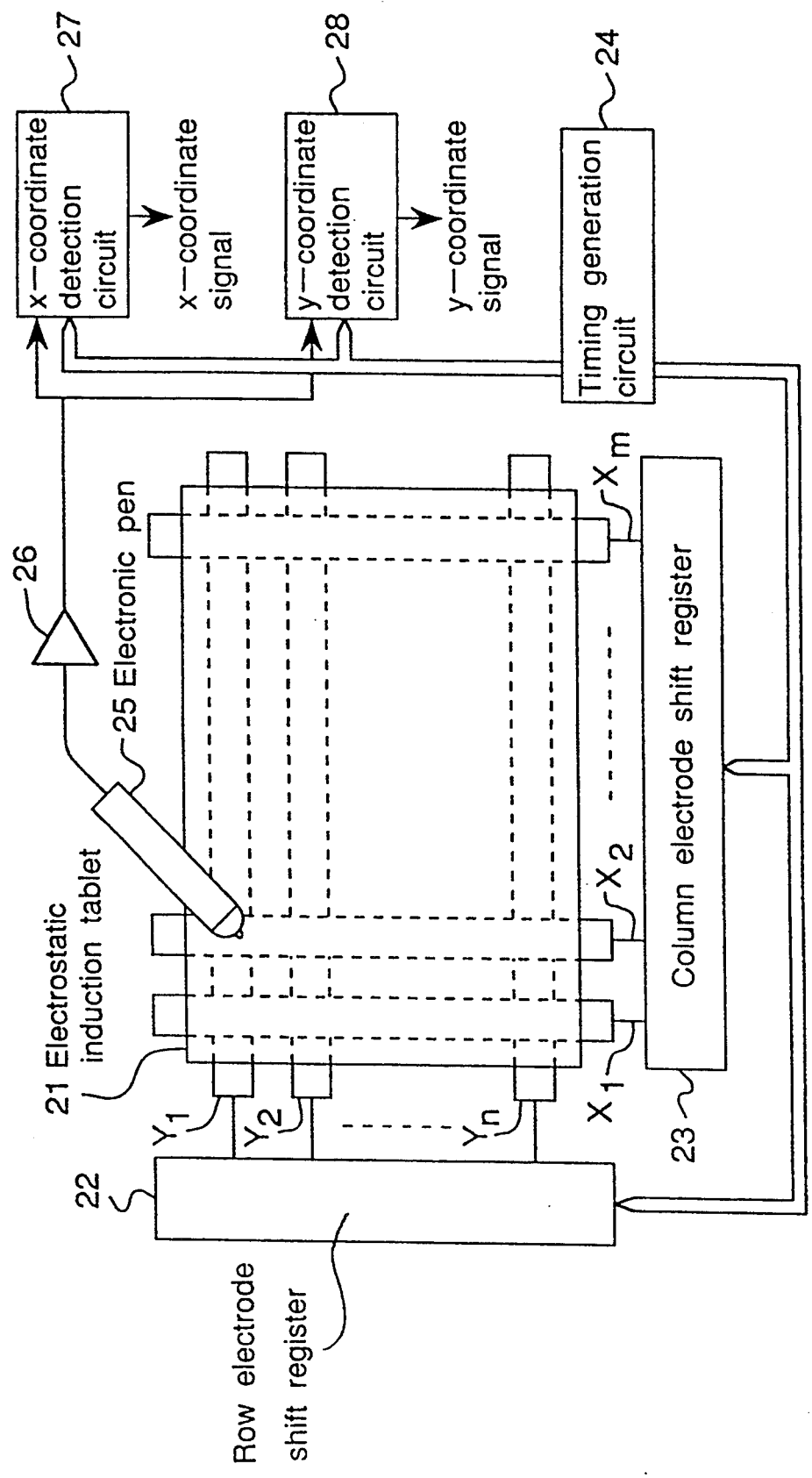

DISPLAY-INTEGRATED TYPE TABLET DEVICE WITH HIGH COORDINATE DETECTION ACCURACY AND METHOD FOR DRIVING THE SAME

BACKGROUND OF THE INVENTION

1. Field of the Invention

The present invention relates to a display-integrated type tablet device concurrently having an image display function for use in a laptop computer, a word processor, or the like, and a method for driving the same.

2. Description of the Prior Art

Conventionally, there has been a display-integrated type tablet device formed by integratingly laminating an image display unit with a tablet. FIG. 16 shows a schematic view of an electrostatic induction tablet and a drive section thereof for use in such a display-integrated type tablet device.

An electrostatic induction tablet 21 is formed by placing a glass substrate on which column electrodes $X_1, X_2, \ldots, X_m$ (an arbitrary column electrode referred to as X hereinafter) are arranged in parallel opposite to a glass substrate on which row electrodes $Y_1, Y_2, \ldots Y_n$ (an arbitrary row electrode referred to as Y hereinafter) are arranged in parallel so that the electrodes cross each other at right angles and fixing the substrates with interposition of a spacer (transparent adhesive or the like). Each row electrode Y is connected to a row electrode shift register 22, while each column electrode X is connected to a column electrode shift register 23.

In the above case, the column electrode X and the row electrode Y are formed of indium tin oxide (ITO) or the like to be approximately transparent.

The row electrode shift register 22 and the column electrode shift register 23 are connected to a timing generation circuit 24. The timing generation circuit 24 is connected to an x-coordinate detection circuit 27 and a y-coordinate detection circuit 28. The x-coordinate detection circuit 27 detects the x-coordinate at the tip end of an electronic pen 25 based on a signal from the timing generation circuit 24 and a signal input from the electronic pen 25 via an operational amplifier 26, and outputs an x-coordinate signal representing the x-coordinate. In the same manner as above, the y-coordinate detection circuit 28 outputs a y-coordinate signal representing the y-coordinate at the tip end of the electronic pen 25.

The electrostatic induction tablet 21 having the above-mentioned construction has a light transmittance of approximately 85%. Therefore, when the electrostatic induction tablet 21 is laminated on a liquid crystal display, an image displayed on the liquid crystal display can be viewed through the electrostatic induction tablet 21. Therefore, the electrostatic induction tablet 21 is laminated on the liquid crystal display to construct a display-integrated type tablet device to allow coordinates on the liquid crystal display to be input by means of the electrostatic induction tablet 21 and the electronic pen 25.

The electrostatic induction tablet 21 and the drive section thereof operate in a manner as follows.

In detail, firstly shift data and a clock signal are transmitted from the timing generation circuit 24 to the column electrode shift register 23. Then scanning pulses of column electrode scanning signals $x_1$ through $x_m$ as shown in FIGS. 17A and 17B are sequentially applied from the column electrode shift register 23 to each column electrode X. Then, in the same manner as above, scanning pulses of row electrode scanning signals $y_1$ through $y_n$ are sequentially applied from the row electrode shift register 22 to each row electrode Y. In the above case, the electronic pen 25 is made to approach the surface of the electrostatic induction tablet 21.

With the above-mentioned operation, since the tip electrode (not shown) of the electronic pen 25 is coupled with each of the column electrode X and the row electrode Y through a stray capacitance, an induction voltage as shown in FIG. 18 (a) is induced at the tip electrode of the electronic pen 25. In the present case, the tip electrode is connected to the operational amplifier 26 to set up the impedance measured from the input side of the tip electrode higher than the impedance measured from the output side of the operational amplifier 26.

Thus based on the induction voltage induced at the tip electrode, the coordinates at the tip end of the electronic pen 25 are detected in a manner as follows.

In detail, an induction voltage signal having a waveform as shown in FIG. 18 (a) output from the electronic pen 25 is made through a low-pass filter and an amplifier to have a waveform as shown in FIG. 18 (b), and then input to the x-coordinate detection circuit 27 or the y-coordinate detection circuit 28.

The x-coordinate detection circuit 27 measures a time (Ts in FIG. 18 (b)) from the time when the scanning pulses of the column electrode scanning signal $x_1$ as shown in FIG. 17 starts to be applied from the column electrode shift register 23 to the column electrode $X_1$ to start scanning of the column electrode X to the time when a peak of the signal from the electronic pen 25 is input based on the clock signal from the timing generation circuit 24 and at the tip end of the electronic pen 25 on the electrostatic induction tablet 21. In the display-integrated type tablet device, by displaying on the display screen of the liquid crystal display a letter or a figure which has been input by tracing the surface of the electrostatic induction tablet 21 with the tip end of the electronic pen 25, the letter or figure can be input as if it were written on a paper with writing implements such as a ball-point pen.

However, the above-mentioned display-integrated type tablet device has the following problems.

First, when the surface of the electrostatic induction tablet 21 is traced by the electronic pen 25 while monitoring the display screen of the liquid crystal display, it is very hard to view the display screen of the liquid crystal display.

In detail, the column electrode X and the row electrode Y of the electrostatic induction tablet 21 are formed of tin oxide, indium oxide, or the like to have a transparency on a transparent substrate made of glass, plastic, or the like. However, the thus formed electrode has a light transmittance of approximately 85% being not so high in comparison with the light transmittance of the substrate, and is accompanied by a blur. The electrodes are arranged regularly in a grating form. Therefore, the the signal from the electronic pen 25. Then based on the measured value, an x-coordinate signal representing the x-coordinate at the tip end of the electronic pen 25 is output.

In the same manner as above, the y-coordinate detection circuit 28 measures a time from the time when scanning of the row electrode Y starts to the time when a peak of the signal from the electronic pen 25 is input. Then based on the measured value, a y-coordinate signal representing the y-coordinate at the tip end of the electronic pen 25 is output.

In the above case, the time Ts is measured by counting the number of pulses of the clock signal applied to the row electrode shift register 22 or the column electrode shift register 23.

As described above, since the electrostatic induction tablet 21 can detect the coordinates at the tip end of the electronic pen 25 with high accuracy regardless of its relatively simple construction, the tablet 21 is extensively used in a small computer or the like.

An electrostatic induction tablet 21 as described above and a liquid crystal display (not shown) are laminated to constitute a display-integrated type tablet device in which image display is effected on the pixel of the liquid crystal display corresponding to the coordinates electrodes $X_1, X_2, \ldots, X_m, Y_1, Y_2, \ldots Y_n$ of the electrostatic induction tablet 21 are conspicuous more than expected. The above-mentioned phenomenon is significant particularly in a simple type display-integrated type tablet device provided with no back light.

Furthermore, a comparatively great area of the display screen of the liquid crystal display is covered with the electrodes $X_1, X_2, \ldots X_m, Y_1, Y_2, \ldots Y_n$ of the electrostatic induction tablet 21. As a result, the display screen of the liquid crystal display is dark and has a low contrast.

Furthermore, since the liquid crystal display and the electrostatic induction tablet 21 are constructed separately, it is possible that the liquid crystal display and the electrostatic induction tablet 21 are relatively displaced when the liquid crystal display and the electrostatic induction tablet 21 are laminatedly assembled to be integrated. When such displacement takes place, there is disadvantageously generated a displacement between the pen-input position on the liquid crystal display (the position pointed by the tip end of the electronic pen 25) and the position of the pixel on which image display is effected according to the pen input on the display screen of the liquid crystal display. The above fact hinders any letter or figure from being input as if it were written on a paper with writing implements such as a ball-point pen.

Furthermore, since the liquid crystal display and the electrostatic induction tablet 21 prepared separately are laminatedly assembled to be integrated, the resulting display-integrated type tablet has a great thickness and heavy weight. The above fact results in a serious hindrance in achieving compacting of a small-size computer or a word processor demanded by consumers and a cause for cost increase.

Taking the aforementioned facts into consideration, there is proposed a display-integrated type tablet device as follows.

A first display device with tablet function has an electronic pen electrostatically coupled with the row electrode and the column electrode of an active matrix liquid crystal display (LCD) panel. A period in which the active matrix LCD panel is driven is divided into an image display period and a coordinate detection period. In the coordinate detection period, scanning pulses having a voltage which exerts no influence on image display are successively applied to the row electrode and the column electrode to scan both the electrodes. In the scanning stage, a voltage induced at the electronic pen is detected to detect the coordinates at the tip end of the electronic pen based on the scanning timing of both the electrodes.

A second display device with tablet function has an active matrix LCD panel in which row electrodes and column electrodes for image display and row electrodes and column electrodes for coordinate detection are arranged, an image display pixel electrode connected to both the electrodes via a switching element is provided in each position where the row electrode and the column electrode for image display cross each other, and a coordinate detection pixel electrode connected to both the electrodes for coordinate detection via a switching element is provided in each position where the pixel electrode and the row electrode for coordinate detection cross each other. The electronic pen is coupled with the pixel electrode for coordinate detection in the active matrix LCD panel through an electrostatic capacitance.

The display device with tablet function scans the column electrode and the row electrode for coordinate detection in the active matrix LCD panel to charge the pixel electrode for coordinate detection with electronic charges, and detects the electronic charges by means of the electronic pen to detect the coordinates at the tip end of the electronic pen based on the scanning timing of both the electrodes.

However, each of the above-mentioned display devices with tablet function has the following problems.

In the first display device with tablet function, one frame period is divided into the image display period and the coordinate detection period and the coordinates at the tip end of the electronic pen is detected in the coordinate detection period. Therefore, it is impossible to provide a long coordinate detection period for the purpose of assuring an image display period having a specified duration when the display panel has a great area to have an increased number of row electrodes and column electrodes. The above fact results in the problem that the electrode scanning speed is inevitably increased to consequently reduce the accuracy in detecting the coordinates at the tip end of the electronic pen.

Furthermore, in the coordinate detection period, it is required to scan in the coordinate detection period with scanning pulses having a polarity reverse to that of the scanning pulses successively applied to the row electrodes in the image display period so as to prevent each TFT (Thin Film Transistor) i.e. a switching element from being turned on to consequently change the voltage applied to the liquid crystals. Therefore, it is required to incorporate the function of generating in the coordinate detection period the scanning pulses having a polarity reverse to that of the scanning pulses used in the image display period into the row electrode scanning circuit of the normal active matrix type LCD panel, which causes the problem that a complicated row electrode scanning circuit results.

In the second display device with tablet function, it is required to provide the active matrix type LCD panel with the column electrode and the pixel electrode for image display as well as the column electrode and the pixel electrode for coordinate detection. The above fact results in a complicated active matrix LCD panel construction to consequently cause the problems of reduction in productivity and cost increase.

Furthermore, among the pixel electrodes in the active matrix LCD panel, the pixel electrode which is practically used for image display is only the image display pixel electrode. Therefore, the panel numerical aperture (a ratio of the area of image display pixel electrodes that practically contribute to image display to the area of the display screen of the panel) reduces. The above fact also results in the problem that the image display quality reduces.

SUMMARY OF THE INVENTION

The object of the present invention is therefore to provide an active matrix type display-integrated type tablet device which assures a high coordinate detection accuracy while allowing increase in area of the display screen, high productivity, and cost reduction.

In order to achieve the aforementioned object, there is provided a display-integrated type tablet device having a pair of transparent substrates arranged opposite to each other with interposition of an electro-optical material, a plurality of pixel electrodes arranged in a matrix form on one of the transparent substrates, a plurality of switching elements connected to the pixel electrodes, a plurality of first electrodes and second electrodes connected to the switching elements, first electrode drive means and second electrode drive means for driving respectively the first and second electrodes, and input pen means electrostatically coupled with the first and second electrodes, the display-integrated type tablet device comprising:

first position detection means which detects first position data representing an input position pointed by the input pen means based on a signal from the input pen means in the time when the first electrodes are driven in an electro-optical material drive period in which the first and second electrodes are driven by the first and second electrode drive means to selectively operate the switching elements to write an image into the electro-optical material; and second position detection means which detects second position data representing an input position pointed by the input pen means based on a signal from the input pen means in the time when the second electrodes are driven by the second electrode drive means in a period other than the electro-optical material drive period.

According to the above-mentioned construction, the first and second electrodes are driven by the first and second electrode drive mens in the electro-optical material drive period to selectively operate each switching element to write an image into the electro-optical material interposed between the pair of transparent substrates arranged opposite to each other. In the above case, the first position data representing the input position of the input pen means is detected by the first position detection means based on the signal from the input pen means when the first electrode is driven.

In the time other than the electro-optical material drive period, the second electrode is driven by the second electrode drive means, and the second position data representing the input position is detected by the second position detection means based on the signal from the input pen means when the second electrode is driven.

Thus the first position data in the input position of the input pen means is detected in the electro-optical material drive period. Therefore, it is not required to set up any detection period for the first position data in the time other than the electro-optical material drive period to allow the first and second position data representing the input position of the input pen means to be detected without increasing the position detecting speed.

In an embodiment, the first electrodes are row electrodes, the second electrodes are column electrodes, the first electrode drive means is row electrode drive means, and the second electrode drive means is column electrode drive means.

According to the above-mentioned embodiment, the row electrode is driven by the row electrode drive means in the electro-optical material drive period, while the column electrode is driven by the column electrode drive means to selectively operate each switching element. Then an image is written into the electro-optical material interposed between the pair of transparent substrates arranged opposite to each other. In the above case, the first position data representing the input position of the input pen means is detected by the first position detection means based on the signal from the input pen means when the row electrode is driven.

In the time other than the electro-optical material drive period, the column electrode is driven by the column electrodes drive means, and the second position data representing the input position is detected by the second position detection means based on the signal from the input pen means when the column electrode is driven.

There is provided a display-integrated type tablet device comprising:

an active matrix type display panel having a plurality of row electrodes arranged in parallel on a transparent substrate and a plurality of column electrodes which cross the row electrodes at right angles on the transparent substrate, a plurality of switching elements which are arranged in a position where both the electrodes cross each other on the transparent substrate and have control terminals connected to the row electrodes and input terminals connected to the column electrodes, pixel electrodes arranged on the transparent substrate and connected to output terminals of all the switching elements, and an opposite electrode on a substrate arranged opposite to the pixel electrodes with interposition of an electro-optical material layer;

an electronic pen having at a tip end thereof an electrode electrostatically coupled with the row electrodes and the column electrodes of the display panel;

a display control circuit which outputs a display control signal and display data for displaying an image on a pixel matrix comprised of an area of the pixel electrodes of the display panel;

a detection control circuit which outputs a scanning control signal for scanning the column electrodes of the display panel;

a switching circuit which switchingly selects the display control circuit in an image display period output the display control signal and the display data from the display control circuit, and switchingly selects the detection control circuit in an x-coordinate detection period to output the scanning control signal from the detection control circuit;

a row electrode drive circuit which generates a row electrode scanning signal for sequentially scanning the row electrodes in the image display period based on the display control signal from the display control circuit;

a column electrode drive circuit which generates a column electrode drive signal for giving electric charges for displaying an image to the pixel electrodes connected to the row electrodes being scanned in the image display period based on the display control signal and the display data from the switching circuit, and generates a column electrode scanning signal for sequentially scanning the column electrodes in the x-coordinate detection period based on the scanning control signal from the switching circuit; and a coordinate detection circuit which detects a y-coordinate at the tip end of the electronic pen in the image display period based on a voltage induced at the electrode of the electronic pen due to the row electrode scanning signal input from the row electrode drive circuit to each of the row electrodes, and detects an x-coordinate at the tip end of the electronic pen in the x-coordinate detection period based on a voltage induced at the electrode of the electronic pen due to the column electrode scanning signal input from the column electrode drive circuit to each of the column electrodes.

According to the above-mentioned embodiment, the display control circuit is switchedly selected by the switching circuit to enter into the image display period. Then the row electrode scanning signal is generated by the row electrode drive circuit based on the display control signal from the display control circuit. Meanwhile, the column electrode drive signal is generated by the column electrode drive circuit based on the display control signal and the display data from the switching circuit.

Based on the thus generated row electrode scanning signal and column electrode scanning signal, a voltage corresponding to the display data is applied to each pixel in the row selected through sequential scanning of the pixel matrix of the display panel to consequently display an image.

In the above case, a voltage is induced at the electrode of the electronic pen due to the row electrode scanning signal input to the row electrode. Then the voltage induced at the electrode of the electronic pen is input to the coordinate detection circuit, and the y-coordinate at the tip end of the electronic pen is detected based on the input voltage.

In short, in the image display period, an image is displayed on the display panel and the y-coordinate at the tip end of the electronic pen on the display panel is detected.

Then the detection control circuit is switchedly selected by the switching circuit to enter into the x-coordinate detection period. Then the column electrode scanning signal generated by the column electrode drive circuit based on the detection control signal from the switching circuit is input to each column electrode to sequentially scan the column electrodes. Consequently, a voltage is induced at the electrode of the electronic pen due to the column electrode scanning signal input to the column electrode.

Thus the voltage induced at the electrode of the electronic pen is input to the coordinate detection circuit, and the x-coordinate at the tip end of the electronic pen is detected based on the input voltage.

In short, in the x-coordinate detection period, the x-coordinate at the tip end of the electronic pen on the display panel is detected.

In an embodiment, the electro-optical material is comprised of liquid crystals.

According to the above-mentioned construction, the first position data representing the input position of the input pen means is detected by the first position detection means based on the signal from the input pen means in the liquid crystal drive period when an image is written into the liquid crystals interposed between the pair of transparent substrates arranged opposite to each other.

In the time other than the liquid crystal drive period, the second position data representing the input position is detected by the second position detection means based on the signal from the input pen means.

In an embodiment, the first electrode drive means is constructed so as to output a drive signal including a position data detection signal for detecting the first position data and an image display signal for writing an image into the electro-optical material in driving the first electrodes.

According to the above-mentioned embodiment, the first and second electrodes are driven by the first and second electrode drive means in the electro-optical material drive period to selectively operate each switching element to consequently write an image into the electro-optical material interposed between the pair of transparent substrates arranged opposite to each other. Then, the first position data representing the input position of the input pen means is detected by the first position detection means based on the signal from the input pen means when the position data detection signal of the drive signal from the first electrode drive means is output to the first electrode.

In the time other than the electro-optical material drive period, the second electrode is driven by the second electrode drive means, and the second position data representing the input position is detected by the second position detection means based on the signal from the input pen means when the second electrode is driven.

Thus in detecting the first position data in the input position of the input pen means in the electro-optical material drive period, the first position data representing the input position of the input pen means is detected based on the position data detection signal different from the image display signal for writing an image into the electro-optical material output from the first electrode drive means.

In an embodiment, the position data detection signal is generated in the drive signal from the first electrode drive means in a specified time different from a time when an induction voltage is generated in the electrode of the input pen means in a time when the second electrodes are driven by the second electrode drive means within the electro-optical material drive period.

According to the above-mentioned embodiment, in detecting the first position data representing the input position of the input pen means in the electro-optical material drive period, the first position data is detected based on the position data detection signal generated in the specified time different from the generation time of the induction voltage in the signal from the input pen means when the second electrode is driven by the second electrode drive means in the electro-optical material drive period of the drive signal from the first electrode drive means.

In an embodiment, the first electrode drive means is implemented by integrating a detection circuit for generating the position data detection signal with a display circuit for generating the image display signal in one semiconductor integrated circuit.

According to the above-mentioned embodiment, the position data detection signal in detecting the first position data representing the input position of the input pen means in the electro-optical material drive period is generated by the detection circuit which constitutes a part of the first electrode drive means composed of a semiconductor integrated circuit.

In an embodiment, the first electrodes are row electrodes, the second electrodes are column electrodes, the first electrode drive means is row electrode drive means, and the second electrode drive means is column electrode drive means.

According to the above-mentioned embodiment, the first position data representing the input position of the input pen means is detected by the first position detection means in the electro-optical material drive period based on the signal from the input pen means when the position data detection signal of the drive signal from the row electrode drive means is output to the row electrode.

In the time other than the electro-optical material drive period, the column electrode is driven by the column electrode drive means, and the second position data representing the input position is detected by the second position detection means based on the signal from the input pen means when the column electrode is driven.

In an embodiment, the first position detection means extracts a signal from the input pen means within a specified period including a rise time or fall time of the position data detection signal in detecting the first position data representing the position of the input pen means in the electro-optical material drive period and executes detection of the first position data based on the extracted signal.

According to the above-mentioned embodiment, in detecting the first position data representing the input position of the input pen means in the electro-optical material drive period, the signal output from the input pen means in the specified period including the rise time and the fall time of the position data detection signal is extracted by the first position detection means. Then based on the extracted signal, the first position data detection is executed.

Thus only the above-mentioned signal from the input pen means attributed to the position data detection signal in the time when the first electrode is driven is used to execute detection of the first position data with high accuracy.

There is provided a display-integrated type tablet device comprising: an active matrix type display panel having a plurality of row electrodes arranged in parallel on a transparent substrate and a plurality of column electrodes which cross the row electrodes at right angles on the transparent substrate, and a plurality of switching elements which are arranged in a position where both the electrodes cross each other on the transparent substrate and have control terminals connected to the row electrodes and input terminals connected to the column electrodes, pixel electrodes arranged on the transparent substrate and connected to output terminals of all the switching elements, and an opposite electrode on a substrate arranged opposite to the pixel electrodes with interposition of an electro-optical material layer; an electronic pen having at a tip end thereof an electrode electrostatically coupled with the row electrodes and the column electrodes of the display panel; a display control circuit which outputs a display control signal and display data; a detection control circuit which outputs a scanning control signal; a row electrode drive circuit which generates a row electrode scanning signal in the image display period based on the display control signal; a column electrode drive circuit which generates a column electrode drive signal in the image display period based on the display control signal and the display data, and generates a column electrode scanning signal in the x-coordinate detection period based on the scanning control signal; and a coordinate detection circuit which detects a y-coordinate at the tip end of the electronic pen in the image display period based on a voltage induced at an electrode of the electronic pen due to the row electrode scanning signal input to each of the row electrodes, and detects an x-coordinate at the tip end of the electronic pen in the x-coordinate detection period based on a voltage induced at the electrode of the electronic pen due to the column electrode scanning signal input to each of the column electrodes, wherein the row electrode drive circuit is provided with a row electrode scanning signal generating section which generates as the row electrode scanning signal a signal having a coordinate detection pulse for inducing an induction voltage at the electrode of the electronic pen in a specified time different from a time when an induction voltage is induced at the electrode of the electronic pen due to the column electrode drive signal applied to the column electrodes and an image display pulse for applying a voltage to the control terminal of each of the switching elements of the display panel.

According to the above-mentioned embodiment, the y-coordinate at the tip end of the electronic pen is detected based on the voltage of the coordinate detection pulse of the row electrode drive signal output from the row electrode drive circuit by means of the display-integrated type tablet device having the plural number of row electrodes and the plural number of column electrodes crossing the row electrodes at right angles, the active matrix type display panel having the plural number of switching elements, the electronic pen electrostatically coupled with the row electrodes and the column electrodes, the display control circuit, the detection control circuit, the row electrode drive circuit which generates the row electrode scanning signal in the image display period, the column electrode drive circuit which generates the column electrode drive signal in the image display period and generates a column electrode scanning signal in the x-coordinate detection period, and the coordinate detection circuit which detects the y-coordinate at the tip end of the electronic pen in the image display period and detects the x-coordinate at the tip end of the electronic pen in the x-coordinate detection period.

Thus based on the signal different from the image display pulse of the row electrode drive signal, the y-coordinate at the tip end of the electronic pen is detected with high accuracy without being influenced by noise based on the image display pulse and the row electrode drive signal.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a circuit diagram of a part of a row electrode scanning signal generating section in the row electrode drive circuit of a display-integrated type tablet device in accordance with a second embodiment of the present invention;

FIGS. 7A–7D are a timing chart of a variety of signals input to the row electrode scanning signal generating section shown in FIG. 6;

FIG. 16 is a schematic diagram of the structure of a conventional electrostatic induction tablet and a drive section thereof;

DETAILED DESCRIPTION OF THE PREFERRED EMBODIMENTS

The following describes in detail the present invention based on several embodiments with reference to the attached drawings.

First Embodiment

Figure 1:
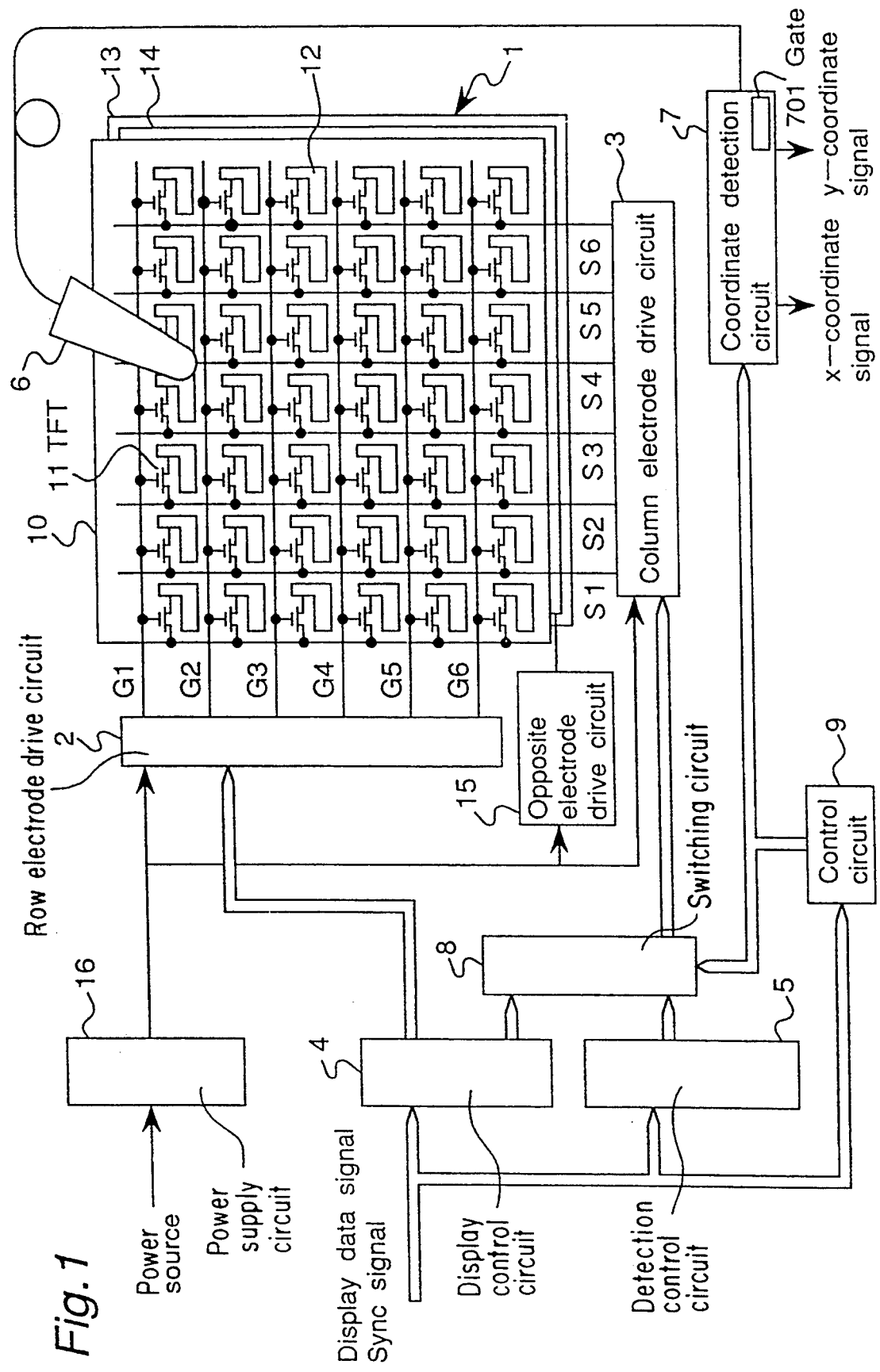
FIG. 1 is a block diagram of a display-integrated type tablet device in accordance with an embodiment of the present invention.

FIG. 1 is a block diagram of a display-integrated type tablet device of the present embodiment. The display-integrated type tablet device is approximately composed of an active matrix type LCD panel (referred to merely as the "display panel" hereinafter) 1 which concurrently has an image display function and an electrostatic induction tablet function, a row electrode drive circuit 2 and a column electrode drive circuit 3 for driving the display panel 1, a display control circuit 4 for supplying a display control signal to the row electrode drive circuit 2 and the column electrode drive circuit 3, a detection control circuit 5 for supplying a detection control signal to the column electrode drive circuit 3, a coordinate detection circuit 7 for detecting the coordinates at the tip end of an electronic pen 6 on the display panel 1 by receiving a signal from the electronic pen 6, and a control circuit 9 for controlling a switching circuit 8 and the coordinate detection circuit 7 to execute an image display operation and a coordinate detection operation.

The display panel 1 has a plurality of row electrodes G1, G2, G3, ..., G6 (an arbitrary row electrode referred to as G hereinafter) arranged in parallel on a transparent TFT (Thin Film Transistor) substrate 10 and a plurality of column electrodes S1, S2, S3, ..., S6 (an arbitrary column electrode referred to as S hereinafter) which are arranged in parallel and cross the row electrodes G at right angles. In a position where each row electrode G and each column electrode S cross each other is provided a TFT 11. Each TFT 11 has a gate electrode connected to the row electrode G and a source electrode connected to the column electrode S. The TFT 11 has a drain electrode connected to a pixel electrode 12. Pixel electrodes 12 are arranged in a matrix form in an area surrounded by each row electrode G and each column electrode S.

On the rear side of the TFT substrate 10 is provided an opposite substrate 13 arranged opposite to the TFT substrate 10. On an inner surface of the opposite substrate 13 is provided an opposite electrode 14 having approximately same area as that of the TFT substrate 10. Between the pixel electrodes 12 and the opposite electrode 14 is interposed liquid crystals (not shown) to constitute a pixel matrix.

To the opposite electrode 14 is supplied a bias voltage by a power supply circuit 16 and an opposite electrode drive circuit 15.

The row electrode drive circuit 2 successively applies scanning pulses of row electrode scanning signals g1 through g6 (an arbitrary row electrode scanning signal referred to as g hereinafter) to respective row electrodes G on the display panel 1 to scan the row electrodes G. Then the scanning pulses are applied to the gate electrode of each TFT 11 by way of the row electrode G to turn on the TFT 11.

The column electrode drive circuit 3 applies to each column electrode S column electrode drive signals $s_{i}1$ through $s_{i}6$ (an arbitrary column electrode drive signal referred to as $s_i$ hereinafter) having drive pulses corresponding to the contents of an image to be displayed relevant to each row electrode G in synchronization with the scanning of the row electrode G. Then the drive pulses are applied to the source electrode of the TFT 11 by way of the column electrode S, with which the signal voltage is applied to the pixel electrode 12 connected to the drain electrode of the TFT 11 which has been turned on by the scanning of the row electrode G by the row electrode drive circuit 2. Thus the image is written into the pixel corresponding to the contents of image display.

The column electrode drive circuit 3 successively applies scanning pulses of column electrode scanning signals $s_21$ through $s_26$ (an arbitrary column electrode scanning signal referred to as $s_2$ hereinafter) to respective column electrodes S independently of the scanning of the row electrodes G to scan the column electrode S.

The scanning pulses generated by the row electrode drive circuit 2 and the drive pulses and scanning pulses generated by the column electrode drive circuit 3 are generated by a bias voltage from the power supply circuit 16.

The display control circuit 4 generates a display control signal for displaying an image on the display panel 1 based on display data and sync signals input from outside of the circuit. Then the generated display control signal is transmitted to the row electrode drive circuit 2 to control the operation of the row electrode drive circuit 2. Furthermore, the display control signal and the input display data signal are transmitted to the switching circuit 8. Meanwhile, the detection control circuit 5 generates a detection control signal for detection of the coordinates at the tip end of the electronic pen 6 based on the sync signals and transmits the signal to the switching circuit 8.

The switching circuit 8 switchingly selects the display control signal and the display data from the display control circuit 4, or the detection control signal from the detection control circuit 5 and transmits the same to the column electrode drive circuit 3. Thus the operation of the column electrode drive circuit 3 is controlled by the display control signal or the detection control signal.

The electronic pen 6 has a high-input-impedance detection electrode (not shown) coupled with the row electrode G and the column electrode S of the display panel 1 through a stray capacitance. Therefore, an induction voltage is induced at the detection electrode due to the scanning pulses applied to the row electrode G or the scanning pulses applied to the column electrode S. The coordinate detection circuit 7 detects the generation timing of the induction voltage generated at the detection electrode of the electronic pen 6 based on a coordinate detection timing signal from the control circuit 9 to detect the coordinates at the tip end of the electronic pen 6.

Figure 2A:
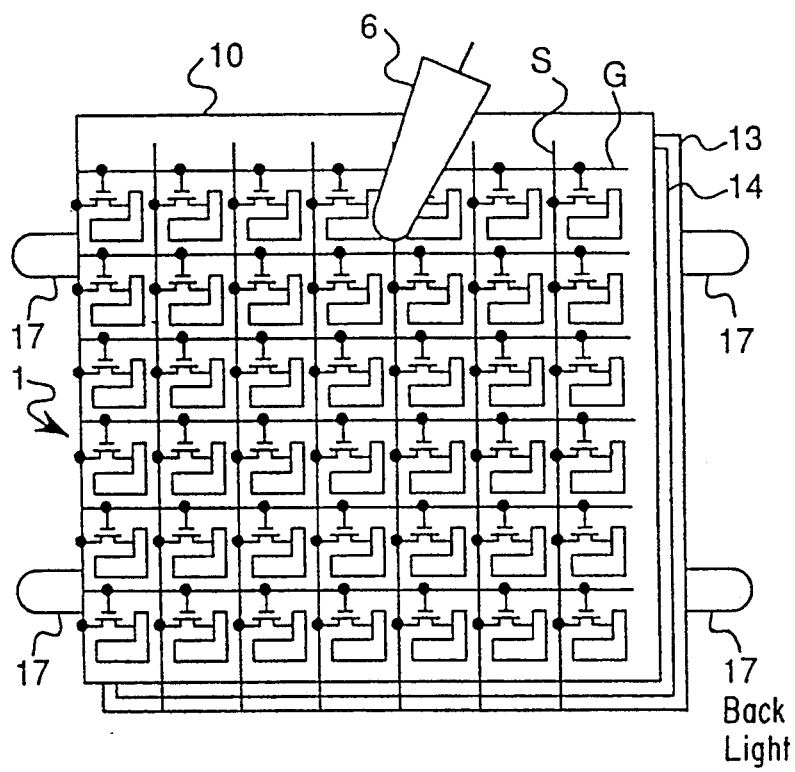
FIGS. 2A and 2B are diagrams each showing a relation in position between a display panel and an electronic pen.
Figure 2B:
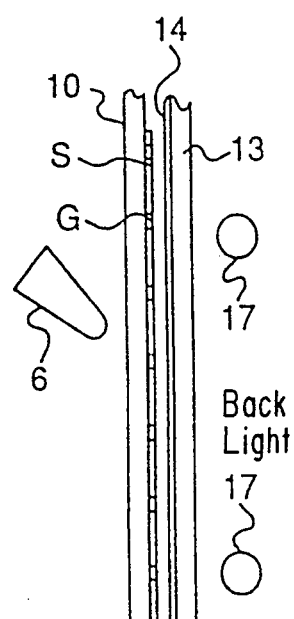

FIGS. 2A and 2B show a relation in position between the display panel 1 and the electronic pen 6, where FIG. 2A is a perspective front view and FIG. 2B is a sectional view.

The electronic pen 6 is positioned on the side of the TFT substrate 10 of the display panel 1 and its detection electrode i.e. tip electrode is coupled with the row electrode G and the column electrode S on the TFT substrate 10 through a stray capacitance. Thus by positioning the electronic pen 6 on the side of the TFT substrate 10 opposite from a back light 17 with the opposite electrode 14, high-frequency noise from the back light 17 is intercepted by the opposite electrode 14 to prevent the noise from the back light 17 from being superimposed on the induction voltage induced at the tip electrode of the electronic pen 6.

Furthermore, the electrostatic coupling between the tip electrode of the electronic pen 6 and the row electrode G and the column electrode S is shielded by the opposite electrode 14 to produce the effect of preventing the induction voltage induced at the tip electrode of the electronic pen 6 from being reduced.

Therefore, the coordinates at the tip end of the electronic pen 6 on the display panel 1 can be stably detected with high accuracy.

Referring again to FIG. 1, when the coordinates at the tip end of the electronic pen 6 is detected by the coordinate detection circuit 7, an x-coordinate signal and a y-coordinate signal representing the coordinates at the tip end are output from the coordinate detection circuit 7. Then, based on the x-coordinate signal and the y-coordinate signal, the display data for displaying a dot image in a position at the tip end of the electronic pen 6 on the display panel 1 is generated by display data signal generation means (not shown because it has no direct relation with the present embodiment), and then input to the display control circuit 4 in a manner as described hereinbefore. Consequently, by virtue of the switching operation of the switching circuit 8 based on the control circuit 9, and the operations of the display control circuit 4, row electrode drive circuit 2, and the column electrode drive circuit 3, a dot image is displayed in a position at the tip end of the electronic pen 6 on the display panel 1.

Thus a letter or a figure can be written into the display panel 1 by means of the electronic pen 6 as if the letter or figure were written on a paper with writing implements. Concurrently, such an input letter or symbol can be recognized by recognition means (not shown) from a change in the x-coordinate signal and the y-coordinate signal, and therefore the result of recognition can be used to execute document formation, designation of control, and the like. The result of recognition can be also used as response means for icons displayed on the display panel 1.

Figure 3:
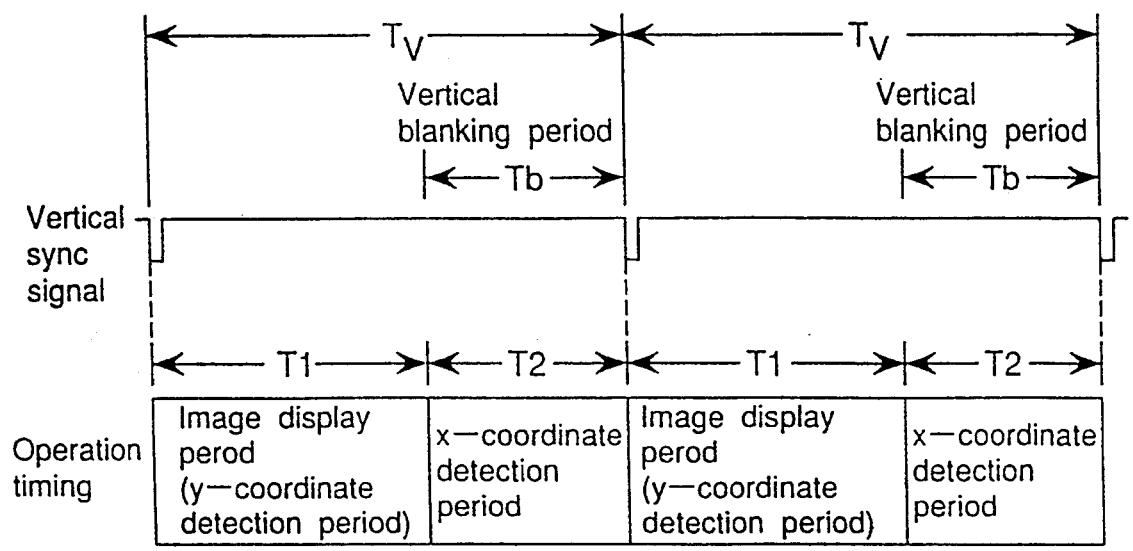
FIG. 3 is a chart of operation timing of the display-integrated type tablet device shown in FIG. 1.
Figure 4A:
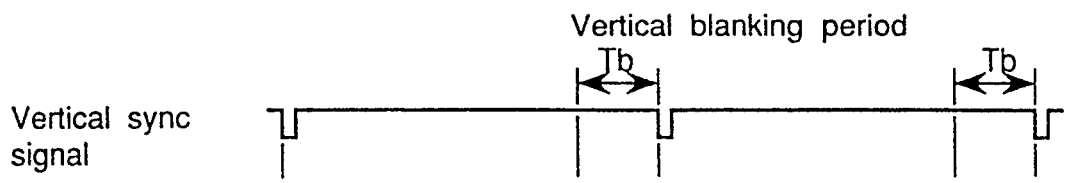
FIGS. 4A–4E are a timing chart of a variety of signals in operation of the display-integrated type tablet device shown in FIG. 1.
Figure 4B:
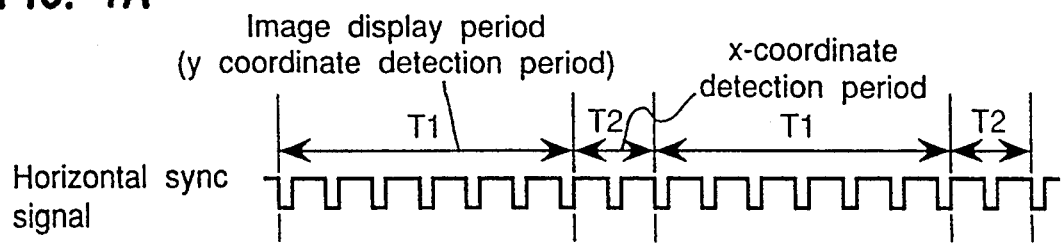
Figure 4C:
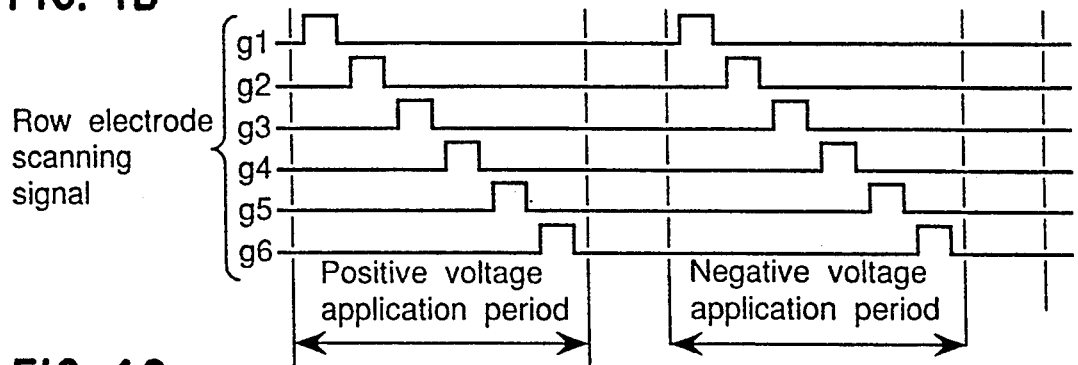
Figure 4D:
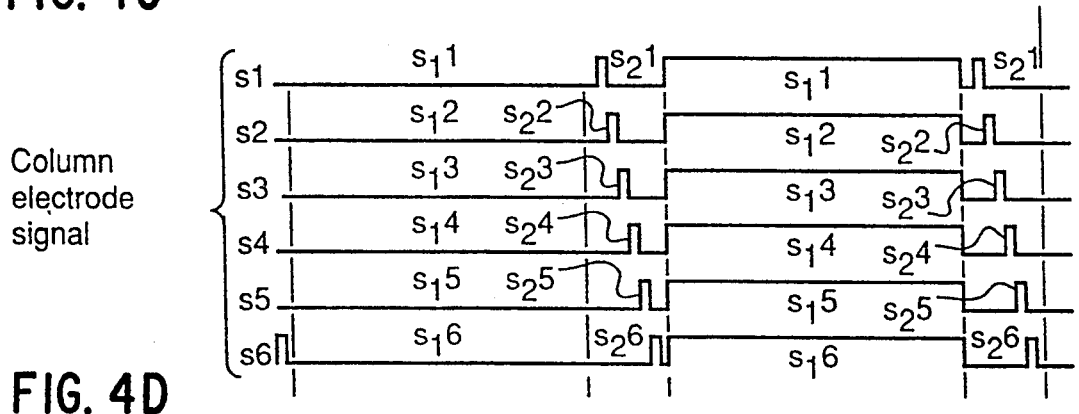
Figure 4E:
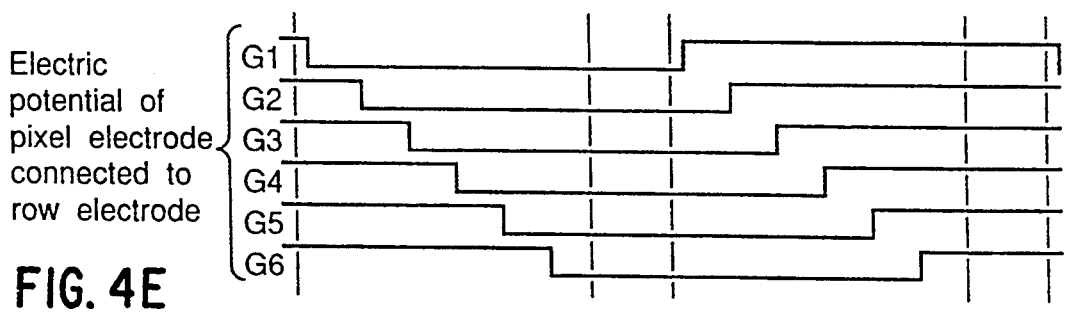
Figure 5A:
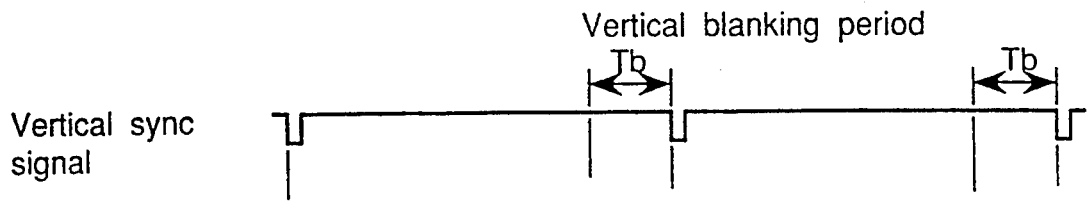
FIGS. 5A–5D are a timing chart of a variety of signals different from the signals shown in FIGS. 4A–4E in operation of the display-integrated type tablet device shown in FIG. 1.
Figure 5B:
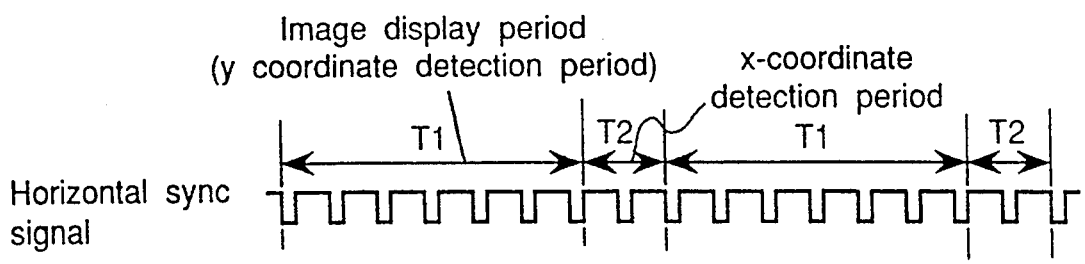
Figure 5C:
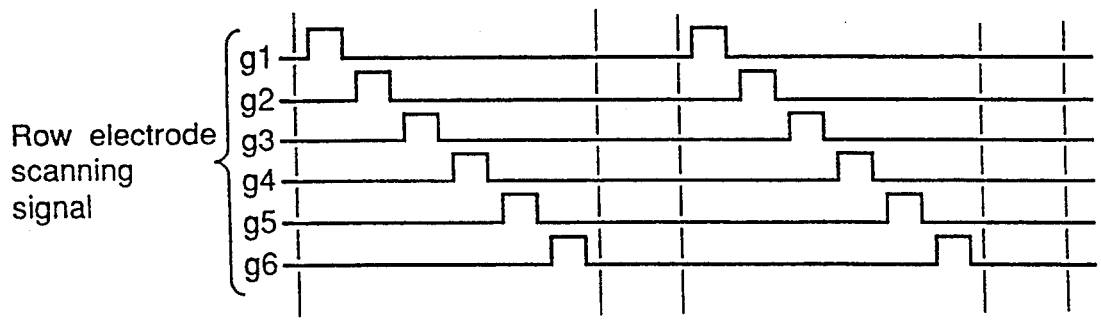
Figure 5D:
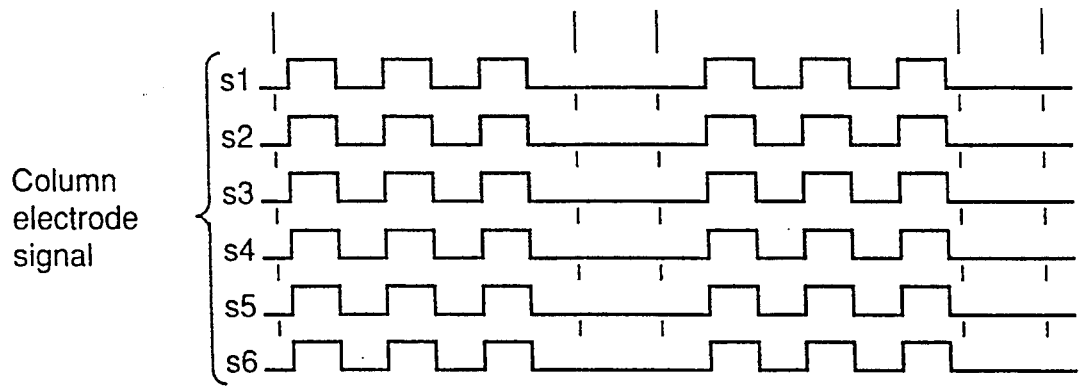

FIG. 3 is a chart showing the operation timing of the aforementioned display-integrated type tablet device. One cycle Tv of a vertical sync signal V is divided into an image display period (y-coordinate detection period) T1 and an x-coordinate detection period T2 of one frame, where the x-coordinate detection period T2 is equal to a vertical blanking period Tb. The division into the detection period (y-coordinate detection period) T1 and the x-coordinate detection period T2 is executed by switchingly selecting between the display control circuit 4 and the detection control circuit 5 by means of the switching circuit 8.

In the image display period (y-coordinate detection period) T1, the display control circuit 4 is switchedly selected by the switching circuit 8 based on a switching signal from the control circuit 9, and the row electrode drive circuit 2 and the column electrode drive circuit 3 are controlled by a display control signal from the display control circuit 4. Then the row electrode scanning signal g is output from the row electrode drive circuit 2 to scan or select a row electrode G on the display panel 1. Meanwhile, the column electrode drive signal $s_1$ corresponding to the display data signal is output from the column electrode drive circuit 3 to be applied to the column electrode S. Thus the image of one frame is displayed on the display panel 1.

In contrast to the above, in the x-coordinate detection period T2, the detection control circuit 5 is switchedly selected by the switching circuit 8, and the column electrode drive circuit 3 is controlled by a detection control signal from the detection control circuit 5. Then the column electrode scanning signal $s_2$ is output from the column electrode drive circuit 3 to scan the column electrode S of the display panel 1.

The x-coordinate at the tip end of the detection pen 6 is detected by detecting the application timing of the scanning pulse successively applied to the column electrode S on the display panel 1 by the column electrode drive circuit 3 by means of the tip electrode of the detection pen 6 in the x-coordinate detection period T2. Meanwhile, the y-coordinate at the tip end of the detection pen 6 is detected by detecting the application timing of the scanning pulse successively applied to the row electrode G by the row electrode drive circuit 2 by means of the tip electrode of the detection pen 6 in the image display period (y-coordinate detection period) T1.

In other words, according to the present embodiment, the row electrode scanning pulse for image display concurrently serves as the row electrode scanning pulse for coordinate detection. With the above-mentioned arrangement, the entire vertical blanking period Tb can be assigned to the x-coordinate detection period to prevent the electrode scanning speed from increasing and allow the x-coordinate detection accuracy to be increased. Since the y-coordinate detection is executed in the image display period T1 that is longer than the vertical blanking period Tb, the y-coordinate detection accuracy can be also increased.

FIG. 4 is a timing chart of a variety of signals in the operation of the aforementioned display-integrated type tablet device. The following describes in detail the operation of the display-integrated type tablet device with reference to FIG. 4.

The sync signals input to the display control circuit 4, detection control circuit 5, and control circuit 9 include a horizontal sync signal H as well as the vertical sync signal V. The vertical sync signal V has a cycle corresponding to one image frame display period, while the horizontal sync signal H has a cycle corresponding to one horizontal image scan period. In the present embodiment, eight cycles of the horizontal sync signal H correspond to one cycle of the vertical sync signal V.

Six cycles of the horizontal sync signal H having eight cycles are assigned to the image display period (y-coordinate detection period) T1, and the remaining two cycles are assigned to the x-coordinate detection period T2.

The row electrode drive circuit 2 successively applies the scanning pulse of the row electrode scanning signal g to the row electrode G in synchronization with one cycle of the horizontal sync signal H in the image display period (y-coordinate detection period) T1 in a manner as described above. In the display-integrated type tablet device of the present embodiment, the scanning pulse successively applied to the row electrode G is used as the scanning pulse for image display and the scanning pulse for y-coordinate detection.

Meanwhile, the column electrode drive circuit 3 operates in synchronization with each cycle of the horizontal sync signal H in the image display period (y-coordinate detection period) T1 in the same manner as in the normal active matrix type LCD panel as described hereinbefore to output to all the column electrodes S the column electrode drive signal $s_1$ into which drive pulses corresponding to the display data are inserted. It should be noted that the drive pulses are eliminated in FIG. 4.

In the x-coordinate detection period T2, a scanning pulse of the column electrode scanning signal $s_2$ is successively applied to three column electrodes S every one cycle of the horizontal sync signal H to scan all the column electrodes S in two cycles of the horizontal sync signal H. In the display-integrated type tablet device of 5, switching circuit 8, coordinate detection circuit 7, control circuit 9, and detection pen 6 to an active matrix type LCD panel approximately composed of the display panel 1, row electrode drive circuit 2, column electrode drive circuit 3, display control circuit 4, and power supply circuit 16. Then each frame period is time-sharingly divided into the image display period (y-coordinate detection period) T1 in which an image is displayed on the pixel matrix of the display panel 1 and the y-coordinate at the tip end of the electronic pen 6 on the display panel 1 is detected, and the x-coordinate detection period T2 in which the x-coordinate at the tip end of the electronic pen 6 on the display panel 1 is detected.

Then in the image display period (y-coordinate detection period) T1, the switching circuit 8 selects the display control circuit 4 under the control of the control circuit 9. Then the row electrodes G are sequentially scanned by the row electrode drive circuit 2 to be selected, while the column electrodes S are driven by the column electrode drive circuit 3 to display an image on the pixels relevant to the selected row electrode G according to the display data.

In the above case, the y-coordinate at the tip end of the electronic pen 6 is stably detected with high accuracy by the coordinate detection circuit 7 based on an the present embodiment, the scanning pulse successively applied to the column electrode S is used as the scanning pulse for x-coordinate detection.

It is required for liquid crystals to be controlled of the molecular alignment thereof by means of an alternating current in order to prevent the deterioration thereof. Therefore, in the present embodiment, a voltage at the opposite electrode 14 is made constant to adopt the arrangement of inverting in polarity the voltage applied to the pixel electrode 12 constituting each pixel of the pixel matrix with respect to the voltage at the opposite electrode 14. For the above purpose, the level of a reference voltage of the column electrode drive signal $s_1$ output from the column electrode drive circuit 3 is inverted every frame.

As a result, as shown in the lowest rows in FIG. 4, the electric potential level at the pixel electrodes 12 connected to an identical row electrode G via the TFT 11 is inverted every time the scanning pulse is applied to the row electrode G, with which the electric potential at each of the pixel electrodes 12 with respect to the electric potential at the opposite electrode 14 is inverted in polarity.

As described above, the present embodiment is constructed by incorporating the detection control circuit induction voltage induced at the tip electrode of the electronic pen 6 due to the scanning pulses of the row electrode scanning signal g output from the row electrode drive circuit 2 to the row electrode G.

In the x-coordinate detection period T2, the switching circuit 8 selects the detection control circuit 5 under the control of the control circuit 9. Then the scanning pulse of the column electrode scanning signal $s_2$ is successively applied to the column electrodes S of the display panel 1 by the column electrode drive circuit 3 to sequentially scan the column electrodes S. Then an induction voltage is induced at the tip end of the electronic pen 6, and the x-coordinate at the tip end of the electronic pen 6 is detected by the coordinate detection circuit 7 based on the induction voltage to consequently output an x-coordinate signal.

Thus by using the display panel 1 as an image display section and a tablet for y-coordinate detection in the image display period (y-coordinate detection period) T1, and using the display panel 1 as a tablet for x-coordinate detection in the x-coordinate detection period T2, the display panel 1 is made to function as a tablet integrated with an image display function.

Therefore, the present embodiment can concurrently solve all the problems of the reduction of brightness and contrast of the display screen in the image display section attributed to the low light transmittance of the row and column electrodes of the conventional tablet, the reduction of visibility of the display section attributed to the regularity in electrode arrangement of the tablet and a misalignment between the display section and the tablet section, and the increase in thickness as well as the increase in cost of the laminated body of the tablet and the display section. In other words, the display-integrated type tablet device of the present embodiment can achieve a display screen with high visibility in inputting a position on the display screen by means of the electronic pen while allowing reduction in thickness and cost of the device.

In the present embodiment, since the y-coordinate at the tip end of the display pen 6 on the display panel 1 is detected in the image display period (y-coordinate detection period) T1 and the x-coordinate is detected in the x-coordinate detection period T2, the entire one frame period can be used as the coordinate detection period. Therefore, the coordinate detection speed can be reduced to allow the coordinates at the tip end of the display pen 6 to be stably detected with high accuracy.

The above arrangement can cope with the increase in number of the row electrodes G and the column electrodes S in company with the increase in area of the display panel.

In the present embodiment, the detection of the y-coordinate at the tip end of the electronic pen 6 is executed by utilizing the scanning pulses applied to the row electrode G in scanning the row electrodes in the image display period T1. Therefore, in detecting the y-coordinate, there is no need to apply to the row electrode G a specific scanning pulse which does not turn on the TFT 11. Furthermore, since the TFT 11 is in the off state in the x-coordinate detection stage, the electronic charges accumulated in the pixel electrode 12 do not change even when scanning pulse is applied to the column electrode S, which does not cause deterioration in image display quality.

Furthermore, in the aforementioned embodiment, it is acceptable to incorporate means for recognizing an input letter or figure to recognize the letter or figure input by means of the electronic pen and execute a variety of processes according to the result of recognition. Otherwise, it is also acceptable to incorporate designation decision means to perceive the contents of a process menu designated by the electronic pen among a variety of process menu (so-called the "icon") displayed on the display panel 1 and execute a process according to the result of perception.

Therefore, by implementing the recognition means and designation decision means as described above and other processing means with a CPU (Central Processing Unit) provided on the rear surface of the display panel 1, there can be implemented a small-size computer which has a very small thickness and uses pen input instead of key input.

In the aforementioned embodiment, there is exemplified a display panel 1 having six row electrodes G and six column electrodes S for simplicity of explanation. However, a practical display panel 1 is provided with, for example, 480 row electrodes G and 640 column electrodes S.

Second Embodiment

The display-integrated type tablet device shown in FIGS. 1, 2A, 2B, 3, and 4A–4E has the following problems, and therefore the present second embodiment is to solve the problems.

First, reference is made to the problems.

In the image display period, an equivalent capacity composed of the pixel electrode 12, the opposite electrode 14, and the liquid crystals interposed between the pixel electrode 12 and the opposite electrode 14 of the display pixel on the pixel matrix is electrically charged to display an image on the display pixel. In the above case, it is often selected to set up each scanning pulse of the row electrode drive signal g applied to the gate electrode of the TFT 11 via the row electrode G relevant to the pixel electrode to have a pulse width (i.e., the "ON" time of the TFT 11) very close to one cycle of the horizontal sync signal H in order to assure a sufficient time for electrically charging the equivalent capacity.

Therefore, the rise time and the fall time of the scanning pulses to be applied to adjoining row electrodes G are placed very close to each other. For the above reason, the trailing edge of a scanning pulse applied to a row electrode G suppresses the leading edge of the scanning pulse applied to the next row electrode G to suppress the change of an induction voltage to be induced at the tip end of the electronic pen 6. The above fact results in the problem that such induction voltage that exhibits a remarkable peak when the row electrode G located at the tip end of the electronic pen 6 is scanned cannot be obtained.

Also, the display panel 1 is driven by an alternating voltage in order to prevent the possible deterioration of the liquid crystals. In the above case, the level of the voltage of the column electrode drive signal $s_1$ successively applied from the column electrode drive circuit 3 to the column electrode S is inverted every frame (i.e., every one cycle of the vertical sync signal V) with respect to the voltage at the opposite electrode 14. However, in the above case, the resulting display image flickers to deteriorate the image display quality.

Therefore, in order to increase the frequency of inverting the voltage level of the column electrode drive signal $s_1$, it is sometimes adopted to invert the level of the voltage of the column electrode drive signal $s_1$ every one cycle of the horizontal sync signal H and every one cycle of the vertical sync signal V in a manner as shown in FIGS. 5A–5D.

In the above case, a voltage is induced at the tip electrode of the electronic pen 6 due to the change of voltage of the column electrode drive signal $s_1$ in scanning the row electrodes. Therefore, noise is superimposed on the regular induction voltage signal (referred to as the "detection signal" hereinafter) in consequence of the scanning of the row electrodes output from the electronic pen 6, which results in the problem that the y-coordinate detection accuracy reduces without any countermeasure.

In the above case, the y-coordinate detection accuracy can be increased by separating only the regular detection signal from the detection signal output from the electronic pen 6.

However, since the scanning pulse of the row electrode drive signal g has a pulse width set up very close to one cycle of the horizontal sync signal H, the generation timing of the scanning pulses of the row electrode drive signal g and the change timing of the voltage of the column electrode drive signal $s_1$ are placed very close to each other in the image display period. Therefore, it is not easy to separate apart both the pulses.

In practice, the row electrode drive signal g of which voltage changes in synchronization with one cycle of the horizontal sync signal H as shown in FIG. 5 changes in a number of levels according to the contents of the display image (the change in level eliminated in FIGS. 5A-5D). Therefore, the change in level of the voltage applied to the column electrodes S due to the change of the contents of the display image exerts not a little irregular influence on the detection signal output from the electronic pen 6. For the above reason, it is still more difficult to separate the regular detection signal and the noise from the detection signal output from the electronic pen 6 in scanning the row electrodes.

Accordingly, the second embodiment provides an active matrix type display-integrated type tablet device capable of increasing the accuracy in detecting the coordinates at the tip end of the electronic pen in scanning the electrode connected to the control terminal of the switching element and a method for driving the device.

The display-integrated type tablet device of the second embodiment has the same basic construction as that of the display-integrated type tablet device of the first embodiment shown in FIG. 1. In the following description, the reference numerals shown in FIG. 1 are used at need, and no detailed description is provided for the constituent elements relevant to the used reference numerals.

The present invention relates to the row electrode drive circuit 2 shown in FIG. 1, and reference is made mainly to the row electrode drive circuit 2 hereinafter.

Figure 14A:
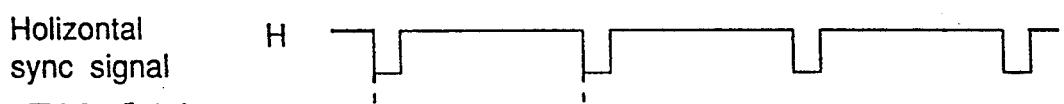
FIGS. 14A–14C are a chart of waveforms of row electrode scanning signals generated by each of the row electrode scanning signal generating sections shown in FIGS. 6, 8, 10, and 12.
Figure 14B:
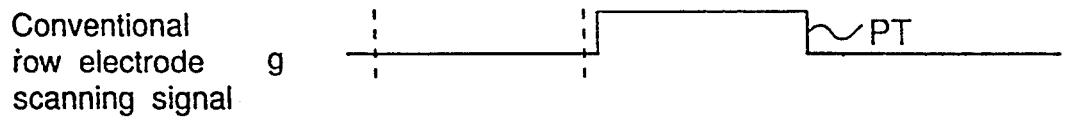
Figure 14C:
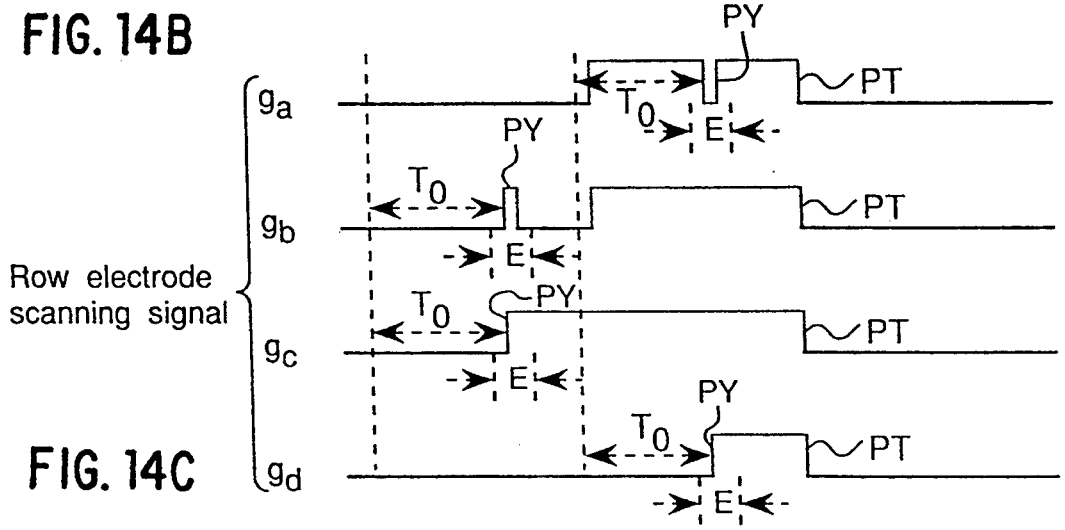

The second embodiment adopts in the image display period the arrangement of making the scanning pulse of the row electrode scanning signal g for turning on the TFT 11 for image display have a pulse width very close to one cycle of the horizontal sync signal H by scanning the row electrode G connected to the gate electrode of the TFT 11 with row electrode scanning signals $g_a$, $g_b$, $g_c$, and $g_d$ having waveforms as shown in FIGS. 14A-14C, and the arrangement of obtaining an induction voltage such that it exhibits a peak at the electrode of the electronic pen 6 when the row electrode G located at the tip end of the electronic pen 6 is scanned even when the voltage of the column electrode drive signal $s_1$ for supplying electronic charges for image display to the pixel electrode 12 connected to the TFT 11 is inverted in level every one cycle of the horizontal sync signal H.

The reason why the regular detection signal free from the influence of noise attributed to the column electrode drive signal $s_1$ can be obtained from the electronic pen 6 when the row electrode G is scanned by the row electrode scanning signal $g_a$, $g_b$, $g_c$, or $g_d$ shown in FIGS. 14A-14C is as follows.

FIG. 15 shows the waveform of a detection signal induced at the tip electrode of the electronic pen 6 due to the change of the voltage of the column electrode drive signal $s_1$ applied to the column electrode S in the image display period in synchronization with the horizontal sync signal H. As is apparent from FIG. 15, the detection signal attributed to the change of the voltage of the column electrode drive signal $s_1$ exhibits its maximum value immediately after the change of the voltage. Then the signal gradually approaches the reference voltage to approximately reach the reference voltage at a time point (b), and thereafter the signal maintains its voltage level until the voltage of the column electrode drive signal $s_1$ changes subsequently.

In other words, in a period from the time point (b) to the fall time (a) of the horizontal sync signal H, the detection signal maintains a stable state regardless of the change of the voltage of the column electrode drive signal $s_1$.

In the above case, the application of the scanning pulse for coordinate detection to the row electrode G in the image display period should be idealistically so timed that the change of the voltage of the column electrode drive signal $s_1$ exerts no influence on the pulse application and the time of application is put apart from a time point (c) of the change of the voltage of the column electrode drive signal $s_1$.

Figure 15A:
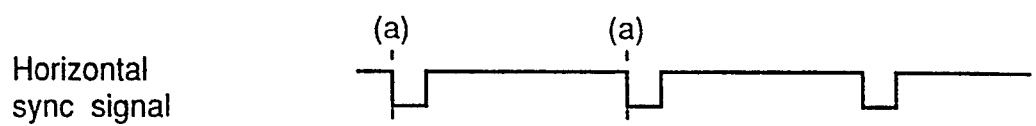
FIGS. 15A–15C are a chart of waveforms of detection signals induced at a tip electrode of an electronic pen due to change of a reference voltage of a column electrode drive signal.
Figure 15B:
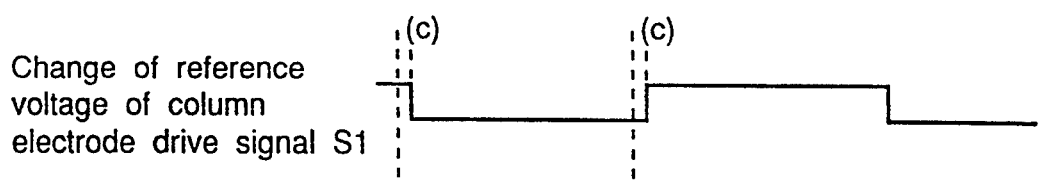
Figure 15C:
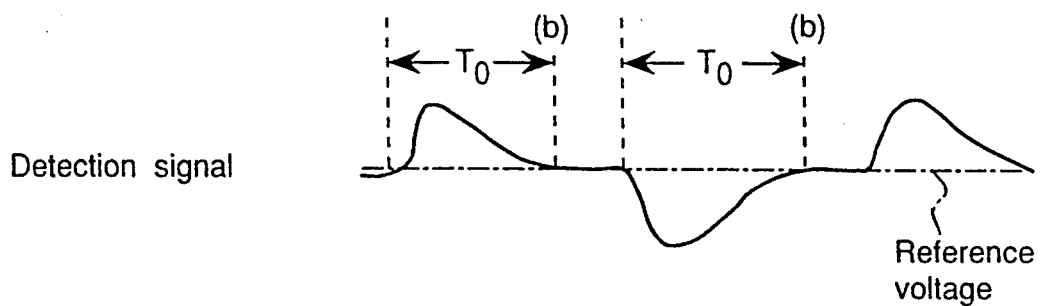
Figure 17A:
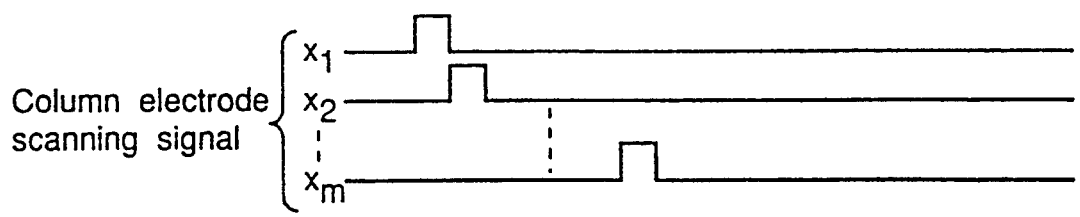
FIGS. 17A–17B are a timing chart of electrode scanning signals output from a row electrode shift register and a column electrode shift register shown in FIG. 16.
Figure 17B:
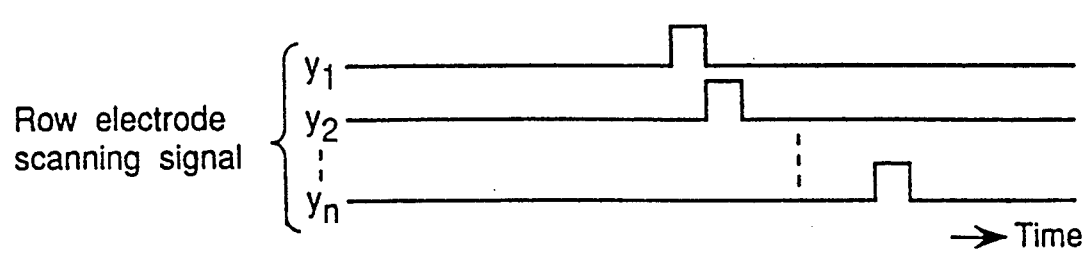
Figure 18A:
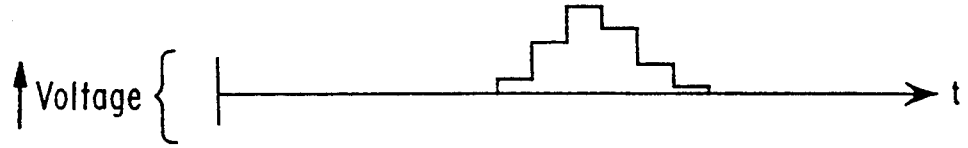
FIGS. 18A–18B are a chart of a waveform of a voltage induced at an electronic pen and a shaped waveform thereof in the device shown in FIG. 16.
Figure 18B:
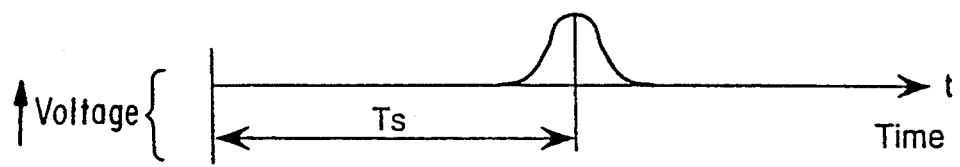

In view of the above, assuming that the time from the fall time point (a) of the horizontal sync signal H to the time point (b) in FIGS. 15A-15C is "$T_0$", the row electrode drive circuit 2 generates in the image display period row electrode scanning signals $g_a$ through $g_d$ in which a coordinate detection pulse PY is incorporated in a position corresponding to the elapse of the time "$T_0$" from the fall time of the horizontal sync signal H to an image display pulse PT for turning on the TFT 11 (refer to FIG. 14A).

The time "$T_0$" is appropriately set up in consideration of the impedance of the column electrode S and the response speed of the tip electrode of the electronic pen 6.

FIG. 6 is a diagram of a part of a row electrode scanning signal generation section of the row electrode drive circuit 2 of the second embodiment, while FIGS. 7A-7D is a timing chart of a variety of signals input to or output from the row electrode scanning signal generation section.

In the second embodiment, the row electrode scanning signal $g_a$ shown in FIG. 14C is generated. The row electrode scanning signal $g_a$ has a waveform in which a slit of the coordinate detection pulse PY is formed in accordance with the timing "$T_0$" in the image display pulse PT of the conventional row electrode scanning signal g.

Referring to FIG. 6, in the row electrode scanning signal generation section of the row electrode drive circuit 2 of the present embodiment, one unit is composed of a shift register 21, inverters 52 and 23, and AND-gates 24, 25, 26, and 27.

To a data input terminal D of the shift register 21 is input a shift data signal s generated in the display control circuit 4. To a clock terminal CK is input a first clock signal ck1 obtained by inverting the horizontal sync signal H. Then the pulse of the shift data signal s is shifted in synchronization with the first clock signal ck1 and then output from output terminals Q1, Q2, Q3, and Q4.

To the inverter 52 is input the first clock signal ck1. Meanwhile, to the inverter 23 is input a second clock signal ck2 obtained by delaying in phase the first clock signal ck1 by the time "$T_0$".

To the AND-gate 24 are input an output signal from the output terminal Q1 of the shift register 21, an output signal from the inverter 52, and an output signal from the inverter 23. In the same manner as above, each of output signals from the output terminals Q2, Q3, and Q4 of the shift register 21, the output signal from the inverter 52, and the output signal from the inverter 23 are input to each of the AND-gates 25, 26, and 27. From the AND-gate 24 is output a row electrode scanning signal $g_a1$. In the same manner as above, each of row electrode scanning signals $g_a2$, $g_a3$, and $g_a4$ is output from each of the AND-gates 25, 26, and 27.

The following describes the operation of the row electrode scanning signal generation section having the above-mentioned construction with reference to FIGS. 7A–7D.

The pulse of the shift data signal s is shifted in synchronization with the fall time of the first clock signal ck1 and then successively output via the AND-gates 24, 25, 26, and 27 to form the image display pulse PT in the row electrode scanning signals $g_a1$, $g_a2$, $g_a3$, and $g_a4$. In the above case, the row electrode scanning signals $g_a1$, $g_a2$, $g_a3$, and $g_a4$ are at "L" level in the period in which the first clock signal ck1 is at "H" level and the output signal of the inverter 52 is at "L" level to correctly regulate the width of the image display pulse PT.

The second clock signal ck2 is a signal for forming the coordinate detection pulse PY in the image display pulse PT set up in a manner as described above. Only in the period in which the second clock signal ck2 is at "H" level, the outputs of the AND-gates 24, 25, 26, and 27 are at "L" level. Thus the coordinate detection pulse PY is formed in a slit shape in the image display pulse PT. In the above case, since the second clock signal ck2 is a signal obtained by delaying in phase the first clock signal ck1 by the time "$T_0$", the coordinate detection pulse PY is formed in the position corresponding to the elapse of the time "T" from the fall time of the horizontal sync signal H.

Therefore, the coordinate detection pulse PY can be formed in an idealistic position free from the influence of the change of the voltage of the column electrode drive signal $s_1$ where the pulse is separated in time apart from the time point of change of the reference voltage of the column electrode drive signal $s_1$.

Then based on an induction voltage induced at the tip electrode of the electronic pen 6 due to the row electrode scanning signal $g_a$ which has been formed in a manner as described above and applied to the row electrode G, the y-coordinates at the tip end of the electronic pen 6 is detected by the coordinate detection circuit 7. In the above case, a gate 701 provided in the coordinate detection circuit 7 extracts the detection signal from the electronic pen 6 only in a period "E" set up so as to include the period in which the coordinate detection pulse PY is generated within the period in which the image display pulse PT is generated in a manner as shown in FIG. 14. With the above-mentioned arrangement, the y-coordinate detection can be executed without being influenced by the rise time and fall time of the image display pulse PT.

According to the second embodiment as described above, the image display pulse PT of the row electrode scanning signal is generated by the shift register 21, and the coordinate detection pulse PY is formed in the position corresponding to the elapse of the time "$T_0$" from the fall time of the horizontal sync signal H by the inverter 23 and the AND-gates 24, 25, 26, and 27 to generate the row electrode scanning signal $g_a$ in which the coordinate detection pulse PY is formed in a slit shape in the image display pulse PT.

Therefore, according to the second embodiment, noise based on the column electrode drive signal $s_1$ applied to the column electrode S is not superimposed on the voltage induced at the tip electrode of the electronic pen 6 due to the coordinate detection pulse PY applied to the row electrode G of the display panel 1 to allow the y-coordinate at the tip end of the electronic pen 6 to be detected with high accuracy.

In the present embodiment, since the coordinate detection pulse PY is formed in a slit shape in the image display pulse PT of the row electrode scanning signal $g_a$, the time required for electrically charging the pixel electrode 12 is reduced by the time corresponding to the slit-shaped pulse. Therefore, it is required to set up the pulse width of the image display pulse PT so that a sufficient time can be assured for the above-mentioned charging time.

Third Embodiment

The present third embodiment relates to generation of a row electrode scanning signal $g_b$ shown in FIG. 14C.

Figure 8:
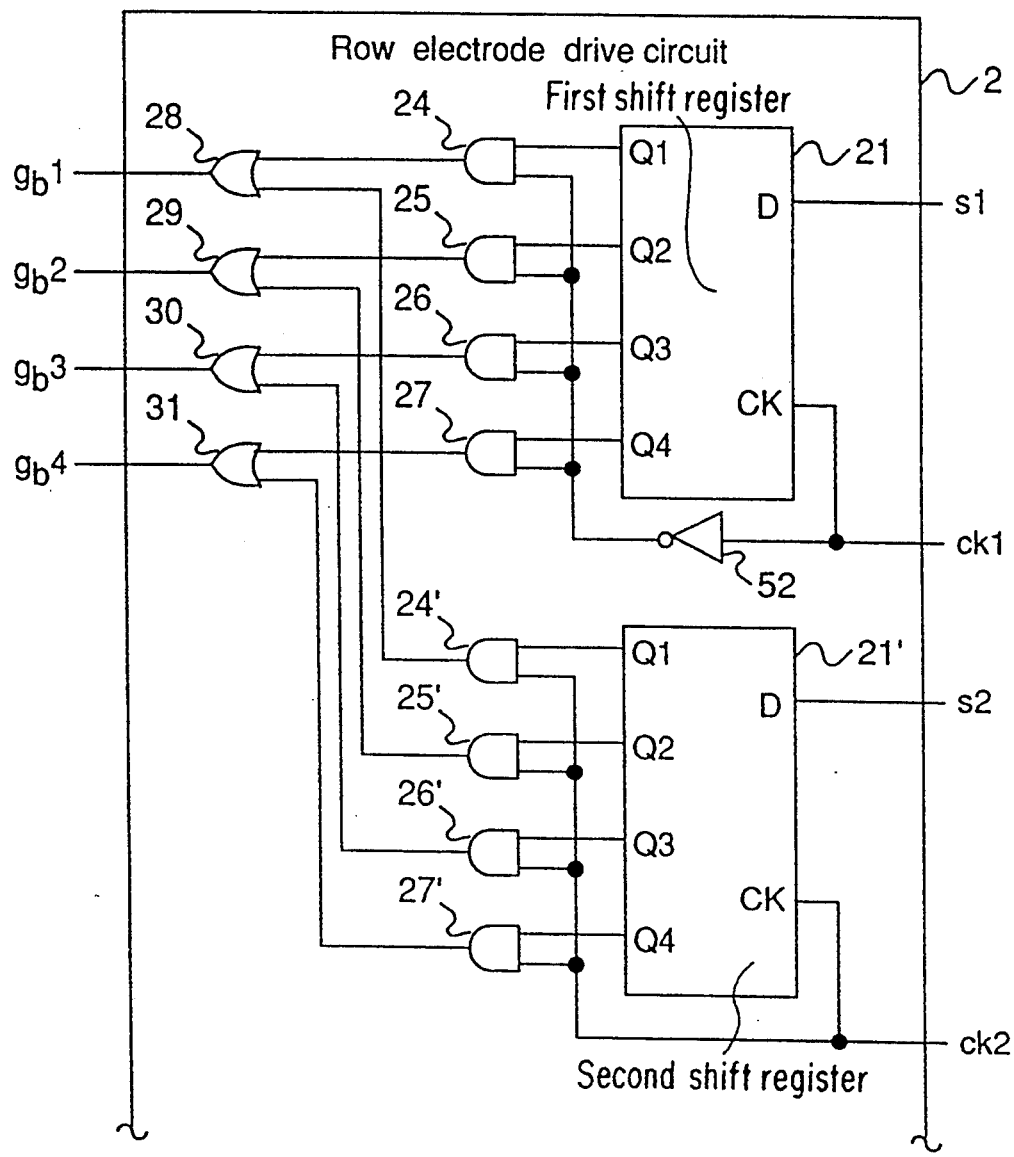
FIG. 8 is a circuit diagram of a part of a row electrode scanning signal generating section different from the circuit shown in FIG. 6.

FIG. 8 is a diagram showing a part of a row electrode scanning signal generation section of a row electrode drive circuit 2, while FIGS. 9A–9E timing charts of a variety of signals input to and output from the row electrode scanning signal generation section. In the following description, the same reference numerals as in FIG. 6 are given to the same constituent elements as the constituent elements shown in FIG. 6.

The row electrode scanning signal $g_b$ generated in the present third embodiment has a waveform in which a coordinate detection pulse PY generated in accordance with the timing "$T_0$" is formed independently of the image display pulse PT.

Referring to FIG. 8, in the row electrode scanning signal generation section of the row electrode drive circuit 2 of the present third embodiment, one unit is composed of a first shift register 21, a second shift register 21', an inverter 52, AND-gates 24, 25, 26, 27, 24', 25', 26', and 27', and OR-gates 28, 29, 30, and 31.

The following describes the operation of the row electrode scanning signal generation section of the present third embodiment with reference to FIGS. 8 and 9A–9E.

Figure 9A:
FIGS. 9A–9E are a timing chart of a variety of signals input to the row electrode scanning signal generating section shown in FIG. 8.
Figure 9B:
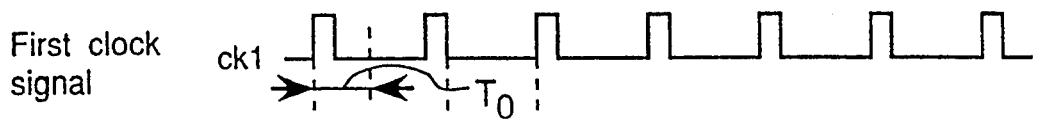
Figure 9C:
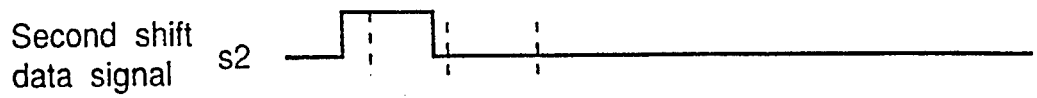
Figure 9D:
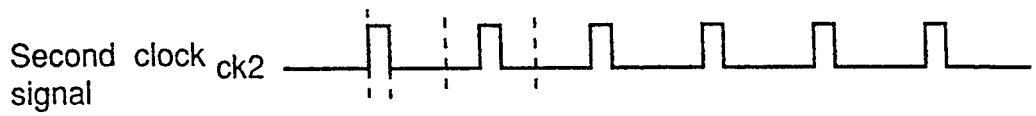
Figure 9E:
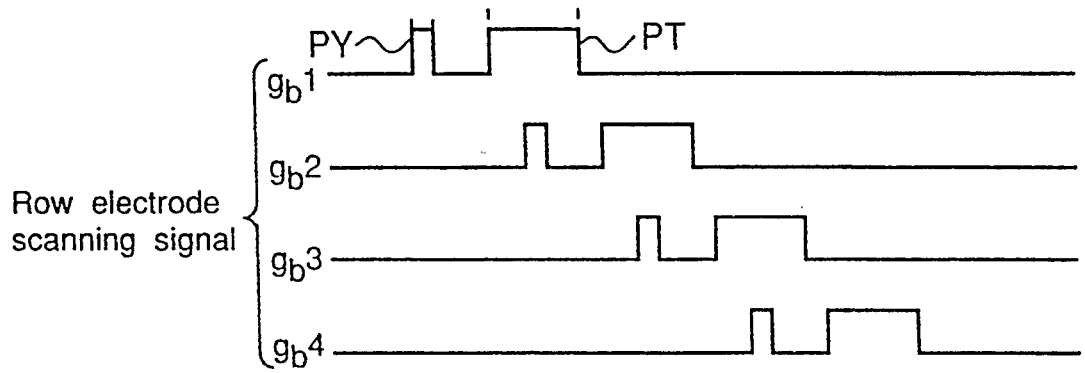

The first shift register 21, the inverter 52, and the AND-gates 24, 25, 26, and 27 operate in the same manner as in the second embodiment based on the first shift data signal s1 and the first clock signal ck1 (signal obtained by inverting the horizontal sync signal H) from the display control circuit 4 to form an image display pulse PT of the row electrode scanning signal $g_b$ as shown in FIG. 9E.

Meanwhile, the second shift register 21 and the AND-gates 24', 25', 26', and 27' form a coordinate detection pulse PY independently of the image display pulse PT based on a second shift data signal s2 and a second clock signal ck2 in a manner as follows.

The second clock signal ck2 is a signal obtained by delaying in phase the first clock signal ck1 by the aforementioned time "$T_0$". Therefore, the pulse of the second shift data signal s2 is shifted in synchronization with the second clock signal ck2 to be successively output from output terminals Q1 through Q4 of the second shift register 21' at a time delayed by the time "$T_0$" from the rise time of the first clock signal ck1.

Thus the signal output from the output terminals Q1 through Q4 of the second shift register 21' and the second clock signal ck2 are input to the AND-gates 24', 25', 26', and 27'. Then the AND-gates 24', 25', 26', and 27' output a pulse signal (coordinate detection pulse PY) obtained by cutting the output signal from the second shift register 21' at the rise time and the fall time of the second clock signal ck2.

The image display pulse PT output from the AND-gate 24 and the coordinate detection pulse PY output from the AND-gate 24' are input to the OR-gate 28. In the same manner as above, the image display pulses PT output from the respective AND-gates 25, 26, and 27 and the respective coordinate detection pulses PY output from the respective AND-gates 25', 26', and 27' are input respectively to the OR-gates 29, 30, and 31. Then the OR-gates 29, 30, and 31 output the row electrode scanning signal $g_b$ having the image display pulse PT and the coordinate detection pulse PY which are formed independently of each other as shown in FIG. 9.

In the above case, since the second clock signal ck2 is a signal obtained by delaying in phase the first clock signal ck1 by the time "$T_0$", the coordinate detection pulse PY is formed in a position corresponding to the elapse of the time "$T_0$" from the fall time of the horizontal sync signal H.

Therefore, the coordinate detection pulse PY can be formed in an idealistic position free from the influence of the change of the voltage of the column electrode drive signal $s_1$ where the pulse is separated in time apart from the time point of change of the voltage of the column electrode drive signal $s_1$.

Then based on an induction voltage induced at the tip electrode of the electronic pen 6 due to the row electrode scanning signal $g_b$ that has been formed in a manner as described above and applied to the row electrode G, the y-coordinates at the tip end of the electronic pen 6 is detected. In the above case, by extracting by means of a gate 701 of the coordinate detection circuit 7 and using the detection signal from the electronic pen 6 only in a period "E" set up so as to include the period in which the coordinate detection pulse PY of the row electrode scanning signal $g_b$ is generated in a manner as shown in FIGS. 14A–14C, the y-coordinate detection can be executed without being influenced by the rise time and the fall time of the image display pulse PT.

Since the TFT 11 connected to the row electrode G to which the coordinate detection pulse PY is applied is turned on due to the application of the coordinate detection pulse PY of the row electrode scanning signal $g_b$, it is possible that image display is effected on a pixel different from the intended pixel to be used for image display. In view of the above, in the present third embodiment, the coordinate detection pulse PY is formed immediately before the image display pulse PT as shown in FIG. 9E. With the above-mentioned arrangement, the image once written into the unintended pixel is immediately erased with application of the next image display pulse PT to result in causing no problem.

Fourth Embodiment

The present fourth embodiment relates to generation of a row electrode scanning signal $g_c$ shown in FIG. 14.

Figure 10:
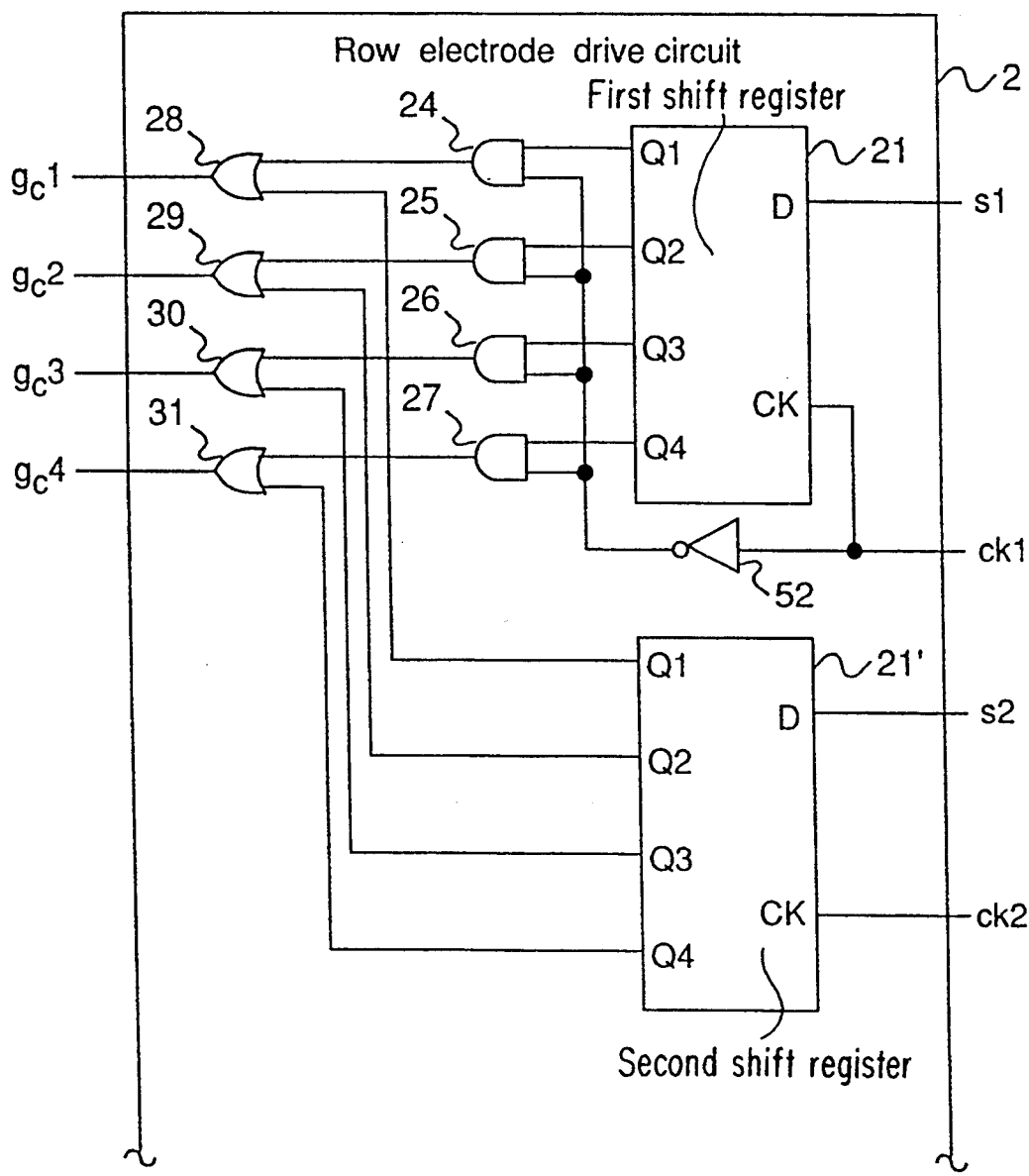
FIG. 10 is a circuit diagram of a part of a row electrode scanning signal generating section different from the circuits shown in FIGS. 6 and 8.

FIG. 10 is a diagram showing a part of a row electrode scanning signal generation section of a row electrode drive circuit 2 of the present fourth embodiment, while FIGS. 11A–11E are a timing chart of a variety of signals input to and output from the row electrode scanning signal generation section. In the following description, the same reference numerals as in FIG. 8 are given to the same constituent elements as the constituent elements shown in FIG. 8.

The row electrode scanning signal $g_c$ generated in the present fourth embodiment has a waveform in which a coordinate detection pulse PY generated in accordance with the timing "$T_0$" is formed continuously with an image display pulse PT.

Referring to FIG. 10, in the row electrode scanning signal generation section of the row electrode drive circuit 2 of the present fourth embodiment, one unit is composed a first shift register 21, a second shift register 21', an inverter 52, AND-gates 24, 25, 26, and 27, and OR-gates 28, 29, 30, and 31.

The following describes the operation of the row electrode scanning signal generation section of the present fourth embodiment with reference to FIGS. 10 and 11.

Figure 11A:
FIGS. 11A–11E are a timing chart of a variety of signals input to the row electrode scanning signal generating section shown in FIG. 10.
Figure 11B:
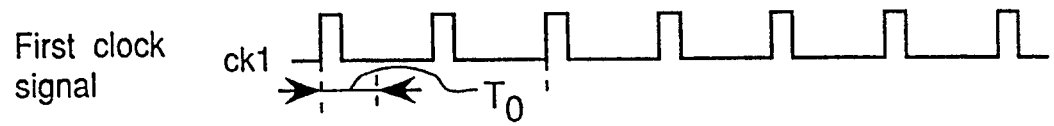
Figure 11C:
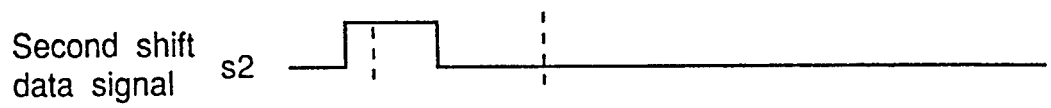
Figure 11D:
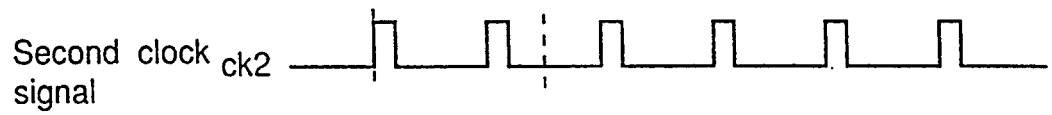
Figure 11E:
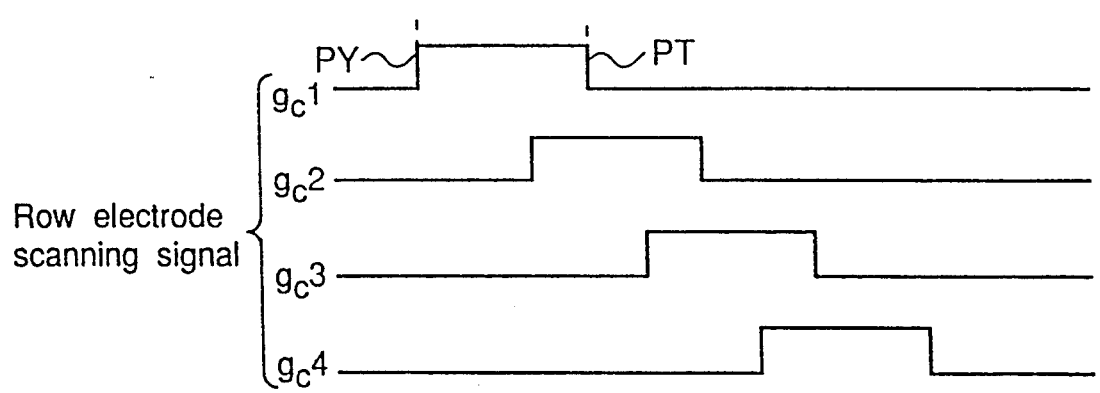

As shown in FIG. 11E, the row electrode scanning signal $g_c$ of the present fourth embodiment is different from the row electrode scanning signal $g_b$ generated in the third embodiment in the point that a coordinate detection pulse PY is not cut off at the fall time of the second clock signal ck2. In view of the above, the fourth embodiment has a construction in which the AND-gates 24', 25', 26', and 27' for cutting off the coordinate detection pulse PY at the fall time of the second clock signal ck2 are removed from the row electrode scanning signal generation section of the third embodiment in FIG. 8.

In detail, the first shift register 21, the inverter 52, and the AND-gates 24, 25, 26, and 27 operate in the same manner as in the third embodiment to form a image display pulse PT of the row electrode scanning signal $g_c$ based on the first shift data signal s1 and the first clock signal ck1 from the display control circuit 4.

Meanwhile, the second shift register 21' shifts the pulse of the second shift data signal $s_2$ in synchronization with the second clock signal ck2 obtained by delaying in phase the first clock signal ck1 by the aforementioned time "$T_0$" and successively outputs the pulse as a coordinate detection pulse PY.

Thus the image display pulse PT output from the AND-gate 24 and the coordinate detection pulse PY output from the output terminal Q1 of the second shift register 21' are input to the OR-gate 28. In the same manner as above, respective image display pulse PT output from the AND-gates 25, 26, and 27 and respective coordinate detection pulse PY output from the output terminals Q2, Q3, and Q4 of the second shift register 21' are input respectively to the OR-gates 29, 30, and 31. Then the OR-gates 28, 29, 30, and 31 output the row electrode scanning signal $g_c$ having the image display pulse PT and the coordinate detection pulse PY which are formed continuously (the image display pulse PT and the coordinate detection pulse PY formed continuously referred to collectively as a "scanning pulse" hereinafter) as shown in FIG. 11E.

In the above case, since the second clock signal ck2 is a signal obtained by delaying in phase the first clock signal ck1 by the aforementioned time "$T_0$", the coordinate detection pulse PY can be formed in an idealistic position free from the influence of the change of the voltage of the column electrode drive signal $s_1$ where the pulse is separated in time apart from the time point of change of the voltage of the column electrode drive signal $s_1$. In detecting the y-coordinate, by extracting and using the detection signal from the electronic pen 6 only in a period "E" set up so as to include the rise time of the scanning pulse of the row electrode scanning signal $g_c$ (i.e., the rise time of the coordinate detection pulse PY) in a manner as shown in FIGS. 14A–14C, the y-coordinate detection can be executed without being influenced by the fall time of the image display pulse PT.

Fifth Embodiment

The present fifth embodiment relates to generation of a row electrode scanning signal $g_d$ shown in FIG. 14C.

Figure 12:
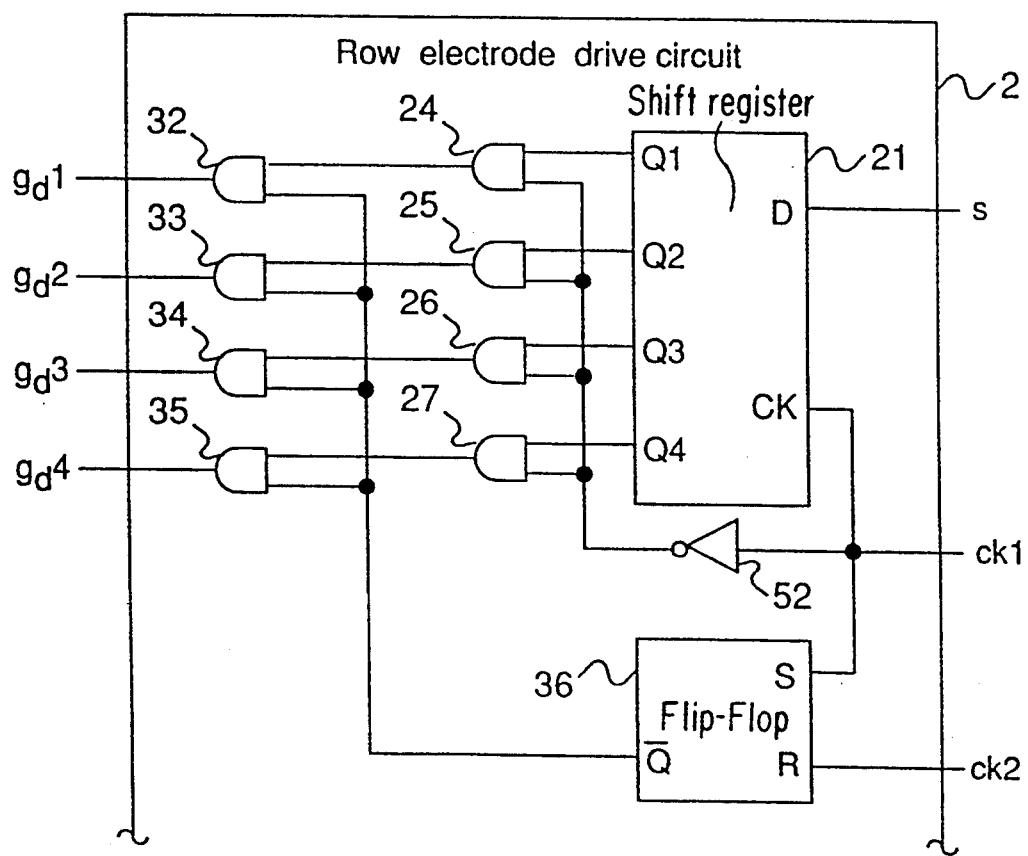
FIG. 12 is a circuit diagram of a part of a row electrode scanning signal generating section different from the circuits shown in FIGS. 6, 8, and 10.

FIG. 12 is a diagram showing a part of a row electrode scanning signal generation section of a row electrode drive circuit 2 of the present fifth embodiment, while FIGS. 13A–13D are a timing chart of a variety of signals input to and output from the row electrode scanning signal generation section. In the following description, the same reference numerals as in FIG. 10 are given to the same constituent elements as the constituent elements shown in FIG. 10.

The row electrode scanning signal $g_d$ generated in the present fifth embodiment has a waveform in which a coordinate detection pulse PY generated in accordance with the timing "T$_0$" and an image display pulse PT are formed continuously in the same manner as in the fourth embodiment.

In the case of the fourth embodiment, as is apparent from FIGS. 10 and 11A–11E, the shift data signal s1 for generating the coordinate detection pulse PY and the shift data signal s2 for generating the image display pulse PT are different shift data signals, where the coordinate detection pulse PY is formed so as to elongate the width of the image display pulse PT.

In contrast to the above arrangement, in the present fifth embodiment, the coordinate detection pulse PY and the image display pulse PT are generated based on an identical shift data signal s to form the coordinate detection pulse PY so as to shorten the width of the image display pulse PT.

Referring to FIG. 12, in the row electrode scanning signal generation section of a row electrode drive circuit 2 of the present fifth embodiment, one unit is composed of a shift register 21, an inverter 52, AND-gates 24, 25, 26, 27, 32, 33, 34, and 35, and a flip-flop 36.

The following describes the operation of the row electrode scanning signal generation section of the present fifth embodiment with reference to FIGS. 12 and 13A–13D.

In the same manner as in the fourth embodiment, the shift register 21, the inverter 52, and the AND-gates 24, 25, 26, and 27 form an image display pulse PT of a row electrode scanning signal $g_d$ based on the shift data signal s and the first clock signal ck1 from the display control circuit 4.

On the other hand, the flip-flop 36 is an SR flip-flop in which, when the level of the first clock signal ck1 input to its set input terminal S becomes "H", a signal at "L" level is output from its output terminal $\overline{Q}$ until the level of the second clock signal ck2 input to its reset terminal R becomes "H".

Figure 13A:
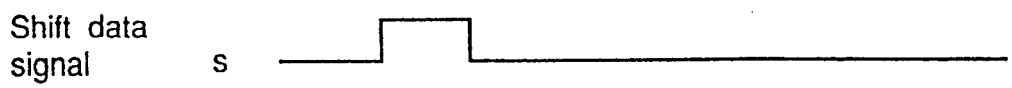
FIGS. 13A–13D are a timing chart of a variety of signals input to the row electrode scanning signal generating section shown in FIG. 12.
Figure 13B:
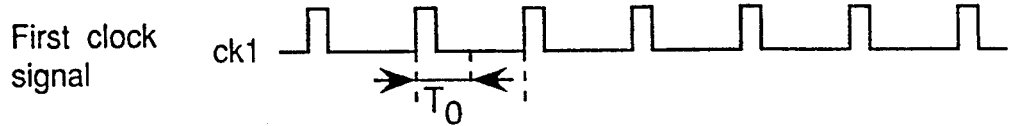
Figure 13C:
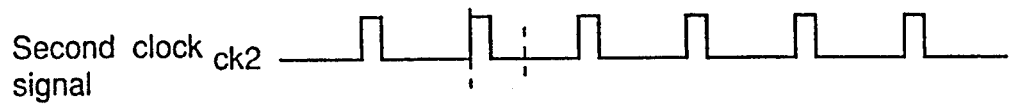
Figure 13D:
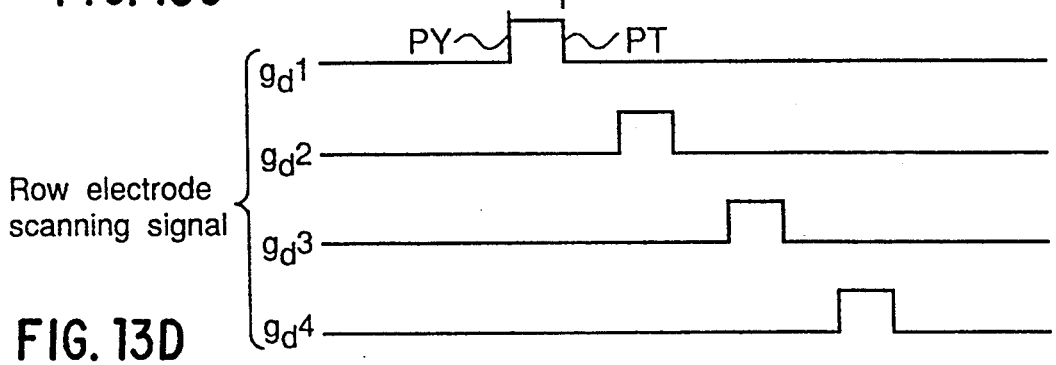

Thus the image display pulses PT output from the AND-gates 24, 25, 26, and 27 are input respectively to the AND-gates 32, 33, 34, and 35. Meanwhile, the signal output from the output terminal $\overline{Q}$ of the flip-flop 36 is input to each of the AND-gates 32, 33, 34, and 35. Then a fore portion of the image display pulse PT is cut off by the output signal from the flip-flop 36 in a manner as shown in FIG. 13D to consequently form the row electrode scanning signal $g_d$ in which the coordinate detection pulse PY and the image display pulse PT are formed continuously (the image display pulse PT and the coordinate detection pulse PY formed continuously referred to collectively as the "scanning pulse" hereinafter).

In the above case, the second clock signal ck2 input to the reset terminal R of the flip-flop 36 is a signal obtained by delaying in phase the first clock signal ck1 by the aforementioned time "T$_0$". Therefore the coordinate detection pulse PY can be formed in an idealistic position free from the influence of the change of the voltage of the column electrode drive signal s$_1$ where the pulse is separated in time apart from the time point of change of the voltage of the column electrode drive signal s$_1$.

Furthermore, in detecting the y-coordinate, by extracting and using the detection signal from the electronic pen 6 only in a period "E" set up so as to include the rise time of the scanning pulse of the row electrode scanning signal $g_d$ (i.e., the rise time of the coordinate detection pulse PY) in a manner as shown in FIG. 14C, the y-coordinate detection can be executed without being influenced by the fall time of the image display pulse PT.

As described above, in each of the aforementioned embodiments, the row electrode scanning signal generation section of the row electrode drive circuit 2 generates the row electrode scanning signal $g_a$ in which the coordinate detection pulse PY is inserted in the image display pulse PT, the row electrode scanning signal $g_b$ in which the image display pulse PT and the coordinate detection pulse PY are formed independently of each other, the row electrode scanning signal $g_c$ in which the coordinate detection pulse PY and the image display pulse PT are continuously formed in the row electrode scanning signal $g_b$, or the row electrode scanning signal $g_d$ in which the fore portion of the image display pulse PT is cut before the coordinate detection pulse PY in the row electrode scanning signal $g_a$.

In the above case, the rise time or the fall time of the coordinate detection pulse PY is set up at a time after the elapse of the time "T$_0$" from the fall time of the horizontal sync signal H. Therefore, the coordinate detection pulse PY can be formed in an idealistic position free from the influence of the change of the voltage of the column electrode drive signal s$_1$ where the pulse is separated in time apart from the time point of change of the voltage of the column electrode drive signal s$_1$.

The row electrode drive circuit and the other circuits of each of the aforementioned embodiments can be simply formed without incorporating any special circuit to the corresponding conventional circuit. Therefore, by implementing each row electrode drive circuit and the like by a semiconductor integrated circuit, further cost reduction and compacting can be achieved in comparison with the conventional display-integrated type tablet device.

In each of the aforementioned embodiments, there is exemplified a display panel 1 having six row electrodes G and six column electrodes S for simplicity of explanation. However, a practical display panel 1 is provided with, for example, 480 row electrodes G and 640 column electrodes S.

In each of the aforementioned embodiments, the row electrode scanning signal generation section of the row electrode drive circuit 2 has been described with regard to only one constituent unit thereof. However, a practical row electrode scanning signal generation section includes a specified number of the above-mentioned one unit formed in parallel corresponding to the number of the row electrodes G.

The circuit construction of the row electrode scanning signal generation section of the present invention is not limited to the circuit construction of any of the aforementioned embodiments. The circuit construction is essentially required to be a circuit construction capable of generating the row electrode scanning signal having any of waveforms as shown in FIG. 14C.

Furthermore, in each of the above-mentioned embodiments, the opposite electrode drive signal has been described as a constant DC level.

However, the present invention can be also applied to a case where the opposite electrode is driven by an opposite electrode drive signal such that it changes in level in synchronization with the change of the voltage of the column electrode drive signal i.e., in the case where the electrode is driven in so-called the AC-driven manner. In such a case, it is required to set up a detection pulse for the row electrode scanning signal so that the signal does not receive influence of the column electrode drive signal and the opposite electrode drive signal.

As is apparent from the above description, the display-integrated type tablet device of an embodiment is constructed by incorporating the first position detection means for detecting the first position data representing the input position of the input pen means in the electro-optical material drive period in which an image is written into the electro-optical material and the second position detection means for detecting the second position data representing the input position in a period other than the electro-optical material drive period into a display-integrated type tablet device having the pair of transparent substrates with interposition of the electro-optical material, the pixel electrodes which are provided on one of the transparent substrates and connected to the switching elements, first and second electrode drive means for driving the first electrodes and the second electrodes connected to each of the switching elements, and input pen means electrostatically coupled with the first and second electrodes. Therefore, it is not required to set up any detection period for detecting the first position data of the input position pointed by the input pen means particularly in a period other than the electro-optical material drive period.

Therefore, the electro-optical material drive period is allowed to have a sufficient duration to allow the display screen to be easily increased in dimensions. Furthermore, the detection speed in detecting the position data can be set up at a slow speed to allow the accuracy in detecting the position data to be increased. Furthermore, the first electrode drive means is not required to generate any special signal for driving the first electrodes, which allows simplification of the first electrode drive means and high productivity to allow cost reduction to be achieved.

According to a display-integrated type tablet device of an embodiment, the first electrodes are composed of row electrodes, the second electrodes are composed of column electrodes, the first electrode drive means is composed of row electrode drive means, and the second electrode drive means is composed of column electrode drive means. With the above-mentioned arrangement, a pair of transparent substrates having the electro-optical material interposed therebetween and the pixel electrodes which are provided on one of the transparent substrates and connected to the switching elements form an active matrix type display panel.

Therefore, the position data of the input position pointed by the input pen means can be detected easily and securely.

According to a display-integrated type tablet device of an embodiment, in the image display period in which the display control circuit is switchedly selected by the switching circuit, the row electrodes of the active matrix type display panel are sequentially scanned to be selected based on the row electrode scanning signal generated by the row electrode drive circuit according to a signal from the display control circuit, and an image is displayed on the pixel relevant to the selected row electrode according to display data based on the column electrode drive signal generated by the column electrode drive circuit.

Then, the y-coordinate at the tip end of the electronic pen is detected by the coordinate detection circuit based on a voltage induced at the electrode of the electronic pen due to the row electrode scanning signal applied to the row electrodes of the display panel.

Meanwhile, in the x-coordinate detection period in which the detection control circuit is switchedly selected by the switching circuit, the column electrodes of the display panel are sequentially scanned based on the column electrode scanning signal generated by the column electrode drive circuit according to a signal from the detection control circuit, and the x-coordinate at the tip end of the electronic pen is detected by the coordinate detection circuit based on a voltage induced at the electrode of the electronic pen due to the column electrode scanning signal applied to the column electrodes.

Since the y-coordinate at the tip end of the electronic pen is detected in the image display period, and the x-coordinate is detected in the x-coordinate detection period in a manner as described above, the row electrode scanning speed and the column electrode scanning speed can be reduced. Therefore, according to the present embodiment, the coordinate detection operation can be executed stably and securely even when the row electrodes and the column electrodes are increased in number in company with the increase in area of the display panel to consequently allow an active matrix type display-integrated type tablet device which can be increased in area and has a high coordinate detection accuracy to be provided.

Furthermore, it is neither required to generate any special scanning pulse such that it does not turn on the switching element in scanning the row electrodes nor required to provide any pixel electrode for coordinate detection, and therefore the normal active matrix type LCD display device can be utilized. The above arrangement can prevent the possible reduction in productivity and increase in cost.

According to a display-integrated type tablet device of an embodiment, the electro-optical material is implemented by liquid crystals, which allows cost reduction by utilizing an active matrix type LCD panel used normally.

According to a method for driving a display-integrated type tablet device of an embodiment, the first and second electrodes are driven by the first and second electrode drive means to selectively operate the switching elements connected to a plurality of pixel electrodes arranged in a matrix form to consequently write an image into the electro-optical material, the first position data representing the input position pointed by the input pen means in the electro-optical material drive period in which the image is written into the electro-optical material is detected, and the second position data representing the input position in the period other than the electro-optical material drive period is detected. Therefore, it is not required to set up any detection period for detecting the first position data of the input position pointed by the input pen means in the period other than the electro-optical material drive period.

With the above-mentioned arrangement, increase in area of the display screen of the display-integrated type tablet device can be easily achieved and the accuracy in detecting the input position data by the input pen means can be increased to allow a high productivity and cost reduction to be achieved.

According to a method for driving a display-integrated type tablet device of an embodiment, the first electrodes are composed of row electrodes, the second electrodes are composed of column electrodes, the first electrode drive means is composed of row electrode drive means, and the second electrode drive means is composed of column electrode drive means. With the above-mentioned arrangement, the position data in the position input by the input pen means on the active matrix type display panel having the electro-optical material interposedly provided can be detected easily and securely.

According to a method for driving a display-integrated type tablet device of an embodiment, the row electrode scanning signal is successively input to the row electrodes of the display panel to scan the row electrodes, while the column electrode drive signal is input to the column electrodes of the display panel to write an image into the electro-optical material. In the image display period in which the image is written into the electro-optical material, the y-coordinate at the tip end of the electronic pen is detected based on a voltage induced at the electrode of the electronic pen electrostatically coupled with the row electrodes due to the row electrode scanning signal applied to the row electrodes. In the x-coordinate detection period other than the image display period, the column electrode scanning signal is successively input to the column electrodes of the display panel to scan the row electrodes and the x-coordinate at the tip end of the electronic pen is detected based on a voltage induced at the electrode of the electronic pen due to the column electrode scanning signal input to the column electrodes. Therefore, the row electrode scanning speed and the column electrode scanning speed can be reduced.

According to the above-mentioned embodiment, the coordinate detection operation can be executed stably and securely even when the row electrodes and the column electrodes are increased in number in company with the increase in area of the display panel to allow the coordinate detection accuracy to be increased.

According to the present invention, it is neither required to generate any special scanning pulse such that it does not turn on the switching element in scanning the row electrodes nor required to provide any pixel electrode for coordinate detection. The above arrangement allows a high-productivity low-cost display-integrated type tablet device utilizing the normal active matrix type LCD display device to be achieved.

According to a method for driving a display-integrated type tablet device of an embodiment, the electro-optical material is implemented by liquid crystals. The above arrangement allows a low-cost display-integrated type tablet device capable of detecting the first position data representing the input position pointed by the input pen means in the electro-optical material drive period to be easily achieved.

According to a display-integrated type tablet device of an embodiment, in the display-integrated type tablet device including a pair of transparent substrates having an electro-optical material interposed therebetween, pixel electrodes which are provided on one of the transparent substrates and connected to switching elements, first and second electrode drive means for driving first electrodes and second electrodes each connected to the switching elements, input pen means electrostatically coupled with the first and second electrodes, first position detection means for detecting the first position data representing the input position pointed by the input pen means in the electro-optical material drive period in which an image is written into the electro-optical material, and the second position detection means for detecting the second position data representing the input position in a period other than the electro-optical material drive period, the first electrode drive means is constructed so as to output a drive signal including a position data detection signal and an image display signal in driving the first electrodes. Therefore, the position data detection signal can be set up so that the signal can detect the position data without receiving noise attributed to the image display signal in detecting the first position data or noise in driving the second electrodes in the period other than the electro-optical material drive period.

According to a display-integrated type tablet device of an embodiment, the position data detection signal of the drive signal output from the first electrode drive means in detecting the first position data representing the input position pointed by the input pen means in the electro-optical material drive period is generated in the specified time different from the time when the induction voltage is generated in the input pen means in driving the second electrodes by the second electrode drive means in the electro-optical material drive period. Therefore, neither noise attributed to the image display signal nor noise in driving the second electrodes in the period other than the electro-optical material drive period is superimposed on the signal from the input pen means in detecting the first position data.

Therefore, the first position data representing the input position pointed by the input pen means can be detected with high accuracy.

According to a display-integrated type tablet device of an embodiment, in detecting the first position data representing the input position pointed by the input pen means in the electro-optical material drive period, the signal output from the input pen means in a specified period including the rise time or the fall time of the position data detection signal is extracted, and based on the extracted signal, the first position data detection is executed. Therefore, only the above-mentioned signal from the input pen means attributed to the position data detection signal in the time when the first electrodes are driven is used to detect the first position data with high accuracy.

According to a display-integrated type tablet device of an embodiment, in detecting the y-coordinate at the tip end of the electronic pen, the y-coordinate is detected based on the voltage of the coordinate detection pulse of the row electrode drive signal which is output from the row electrode drive circuit and includes the coordinate detection pulse for inducing an induction voltage at the electrode of the electronic pen in a specified time different from the generation time of the induction voltage induced at the electrode of the electronic pen due to the column electrode drive signal applied to the column electrodes and an image display pulse for applying a voltage to the control terminal of each of the switching elements of the display panel.

Therefore, the y-coordinate at the tip end of the electronic pen can be detected with high accuracy based on the signal different from the image display pulse of the row electrode drive signal without being influenced by the noise based on the image display signal and the column electrode drive signal.

According to a method for driving a display-integrated type tablet device of an embodiment of the present invention, the row electrode scanning signal successively input to the row electrodes in scanning the row electrodes of the display panel is a row electrode scanning signal including the coordinate detection pulse for inducing an induction voltage at the electrode of the electronic pen in the specified time different from the generation time of an induction voltage induced at the electrode of the electronic pen due to the column electrode drive signal applied to the column electrodes and the image display pulse for applying a voltage to the control terminal of each of the switching elements of the display panel. Therefore, the noise based on the column electrode drive signal is not superimposed on the voltage induced at the electrode of the electronic pen in the time when the coordinate detection pulse of the row electrode scanning signal is applied to the row electrodes.

Therefore, according to the present embodiment, the accuracy in detecting the coordinates at the tip end of the electronic pen in scanning the row electrodes connected to the control terminal of each of the switching elements can be increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display-integrated type tablet device having a pair of transparent substrates arranged opposite to each other with interposition of an electro-optical material, a plurality of pixel electrodes arranged in a matrix form on one of the transparent substrates, a plurality of switching elements connected to the pixel electrodes, a plurality of first electrodes and second electrodes connected to the switching elements, first electrode drive means and second electrode drive means for driving respectively the first and second electrodes, and input pen means electrostatically coupled with the first and second electrodes, the display-integrated type tablet device comprising:

first position detection means which detects first position data representing an input position pointed by the input pen means based on a signal from the input pen means in the time when the first electrodes are driven in an electro-optical material drive period in which the first and second electrodes are driven by the first and second electrode drive means to selectively operate the switching elements to write an image into the electro-optical material; and second position detection means which detects second position data representing an input position pointed by the input pen means based on a signal from the input pen means in the time when the second electrodes are driven by the second electrode drive means in a period other than the electro-optical material drive period.

2. A display-integrated type tablet device as claimed in claim 1, wherein the first electrodes are row electrodes, the second electrodes are column electrodes, the first electrode drive means is row electrode drive means, and the second electrode drive means is column electrode drive means.

3. A display-integrated type tablet device comprising:

an active matrix type display panel having a plurality of row electrodes arranged in parallel on a transparent substrate and a plurality of column electrodes which cross the row electrodes at right angles on the transparent substrate, a plurality of switching elements which are arranged in a position where both the electrodes cross each other on the transparent substrate and have control terminals connected to the row electrodes and input terminals connected to the column electrodes, pixel electrodes arranged on the transparent substrate and connected to output terminals of all the switching elements, and an electrode on a substrate arranged opposite to the pixel electrodes with interposition of an electro-optical material layer;

an electronic pen having at a tip end an electrode electrostatically coupled with the row electrodes and the column electrodes of the display panel;

a display control circuit which outputs a display control signal and display data for displaying an image on a pixel matrix comprised of an area of the pixel electrodes of the display panel;

a detection control circuit which outputs a scanning control signal for scanning the column electrodes of the display panel;

a switching circuit which switchingly selects the display control circuit in an image display period to output the display control signal and the display data from the display control circuit, and switchingly selects the detection control circuit in an x-coordinate detection period to output the scanning control signal from the detection control circuit;

a row electrode drive circuit which generates a row electrode scanning signal for sequentially scanning the row electrodes in the image display period based on the display control signal from the display control circuit;

a column electrode drive circuit which generates a column electrode drive signal for giving electric charges for displaying an image to the pixel electrodes connected to the row electrodes being scanned in the image display period based on the display control signal and the display data from the switching circuit, and generates a column electrode scanning signal for sequentially scanning the column electrodes in the x-coordinate detection period based on the scanning control signal from the switching circuit; and a coordinate detection circuit which detects a y-coordinate at the tip end of the electronic pen in the image display period based on a voltage induced at the electrode of the electronic pen due to the row electrode scanning signal input from the row electrode drive circuit to each of the row electrodes, and detects an x-coordinate at the tip end of the electronic pen in the x-coordinate detection period based on a voltage induced at the electrode of the electronic pen due to the column electrode scanning signal input from the column electrode drive circuit to each of the column electrodes.

4. A display-integrated type tablet device as claimed in claim 1, wherein
the electro-optical material is comprised of liquid crystals.

5. A display-integrated type tablet device as claimed in claim 3, wherein
the electro-optical material is comprised of liquid crystals.

6. A method for driving a display-integrated type tablet device having a pair of transparent substrates arranged opposite to each other with interposition of an electro-optical material, a plurality of pixel electrodes arranged in a matrix form on one of the transparent substrates, a plurality of switching elements connected to the pixel electrodes, a plurality of first electrodes and second electrodes connected to the switching elements, first electrode drive circuit and second electrode drive circuit for driving respectively the first and second electrodes, and input pen element electrostatically coupled with the first and second electrodes, comprising the steps of:
driving the first and second electrodes by the first and second electrode drive circuit to selectively operate the switching elements to write an image into the electro-optical material;
detecting first position data representing an input position pointed by the input pen element in an electro-optical material drive period in which an image is written into the electro-optical material based on a signal from the input pen element electrostatically coupled with the first electrodes in the time when the first electrodes are driven; and
detecting second position data representing an input position pointed by the input pen element in a period other than the electro-optical material drive period based on a signal from the input pen element electrostatically coupled with second electrodes in the time when the second electrodes are driven by the second electrode drive circuit.

7. A method for driving a display-integrated type tablet device as claimed in claim 6, wherein
the first electrodes are row electrodes, the second electrodes are column electrodes, the first electrode drive circuit is row electrode drive circuit, and the second electrode drive circuit is column electrode drive circuit.

8. A method for driving a display-integrated type tablet device having an active matrix type display panel having a plurality of row electrodes arranged in parallel on a transparent substrate and a plurality of column electrodes which cross the row electrodes at right angles on the transparent substrate, a plurality of switching elements which are arranged in a position where both the electrodes cross each other on the transparent substrate and have control terminals connected to the row electrodes and input terminals connected to the column electrodes, pixel electrodes arranged on the transparent substrate and connected to output terminals of all the switching elements, and an opposite electrode on a substrate arranged opposite to the pixel electrodes with interposition of an electro-optical material layer;
an electronic pen having at a tip end an electrode electrostatically coupled with the row electrodes and the column electrodes of the display panel;
a display control circuit which outputs a display control signal and display data for displaying an image on a pixel matrix comprised of an area of the pixel electrodes of the display panel;
a detection control circuit which outputs a scanning control signal for scanning the column electrodes of the display panel;
a switching circuit which switchingly selects the display control circuit in an image display period to output the display control signal and the display data from the display control circuit, and switchingly selects the detection control circuit in an x-coordinate detection period to output the scanning control signal from the detection control circuit;
a row electrode drive circuit which generates a row electrode scanning signal for sequentially scanning the row electrodes in the image display period based on the display control signal from the display control circuit; and
a column electrode drive circuit which generates a column electrode drive signal for giving electric charges for displaying an image to the pixel electrodes connected to the row electrodes being scanned in the image display period based on the display control signal and the display data from the switching circuit, and generates a column electrode scanning signal for sequentially scanning the column electrodes in the x-coordinate detection period based on the scanning control signal from the switching circuit, the method comprising the steps of:
successively inputting the row electrode scanning signal generated based on the display control signal to the row electrodes of the active matrix type display panel to scan the row electrodes while successively inputting the column electrode scanning signal generated based on the display control signal and the display data to the column electrodes of the display panel to selectively drive the switching elements to write an image into the electro-optical material layer;
detecting a y-coordinate at the tip end of the electronic pen in the image display period in which the image is written into the electro-optical material based on a voltage induced at the electrode of the electronic pen electrostatically coupled with the row electrodes due to the row electrode scanning signal input to each of the row electrodes; and
detecting an x-coordinate at the tip end of the electronic pen in the x-coordinate detection period other then the image display period by successively inputting the column electrode scanning signal generated based on the scanning control signal to the column electrodes of the display panel to scan the column electrodes and based on a voltage induced at the electrode of the electronic pen due to the column electrode scanning signal input to each of the column electrodes.

9. A method for driving a display-integrated type tablet device as claimed in claim 6, wherein
the electro-optical material is comprised of liquid crystals.

10. A method for driving a display-integrated type tablet device as claimed in claim 8, wherein
the electro-optical material is comprised of liquid crystals.

11. A display-integrated type tablet device as claimed in claim 1, wherein
the first electrode drive means is constructed so as to output a drive signal including a position data detection signal for detecting the first position data and an image display signal for writing an image into the electro-optical material in driving the first electrodes.

12. A display-integrated type tablet device as claimed in claim 11, wherein
the position data detection signal is generated in the drive signal from the first electrode drive means in a specified time different from a time when an induction voltage is generated in the electrode of the input pen means in a time when the second electrodes are driven by the second electrode drive means within the electro-optical material drive period.

13. A display-integrated type tablet device as claimed in claim 12, wherein
the first electrode drive means is provided with a sequential output section which generates the image display signal and sequentially outputs the signal and a gate section which interrupts a part of the image display signal output from the sequential output section for a specified period so as to generate the position data detection signal in the specified time
to thereby generate the drive signal in which the position data detection signal composed of a slit having a specified width is inserted in the image display signal.

14. A display-integrated type tablet device as claimed in claim 12, wherein
the first electrode drive means is constructed so as to generate the drive signal in which the position data detection signal is separated from the image display signal.

15. A display-integrated type tablet device as claimed in claim 12, wherein
the first electrode drive means is constructed so as to generate the drive signal in which the position data detection signal and the image display signal are continuous to each other.

16. A display-integrated type tablet device as claimed in claim 11, wherein
the first electrode drive means is implemented by integrating a detection circuit for generating the position data detection signal with a display circuit for generating the image display signal in one semiconductor integrated circuit.

17. A display-integrated type tablet device as claimed in claim 11, wherein
the first electrodes are row electrodes, the second electrodes are column electrodes, the first electrode drive means is row electrode drive means, and the second electrode drive means is column electrode drive means.

18. A display-integrated type tablet device as claimed in claim 11, wherein
the first position detection means extracts a signal from the input pen means within a specified period including a rise time or fall time of the position data detection signal in detecting the first position data representing the position of the input pen means in the electro-optical material drive period and executes detection of the first position data based on the extracted signal.

19. A display-integrated type tablet device comprising: an active matrix type display panel having a plurality of row electrodes arranged in parallel on a transparent substrate and a plurality of column electrodes which cross the row electrodes at right angles on the transparent substrate, and a plurality of switching elements which are arranged in a position where both the electrodes cross each other on the transparent substrate and have control terminals connected to the row electrodes and input terminals connected to the column electrodes, pixel electrodes arranged on the transparent substrate and connected to output terminals of all the switching elements, and an electrode on a substrate arranged opposite to the pixel electrodes with interposition of an electro-optical material layer; an electronic pen having at a tip end an electrode electrostatically coupled with the row electrodes and the column electrodes of the display panel; a display control circuit which outputs a display control signal and display data; a detection control circuit which outputs a scanning control signal; a row electrode drive circuit which generates a row electrode scanning signal in the image display period based on the display control signal; a column electrode drive circuit which generates a column electrode drive signal in the image display period based on the display control signal and the display data, and generates a column electrode scanning signal in the x-coordinate detection period based on the scanning control signal; and a coordinate detection circuit which detects a y-coordinate at the tip end of the electronic pen in the image display period based on a voltage induced at an electrode of the electronic pen due to the row electrode scanning signal input to each of the row electrodes, and detects an x-coordinate at the tip end of the electronic pen in the x-coordinate detection period based on a voltage induced at the electrode of the electronic pen due to the column electrode scanning signal input to each of the column electrodes, wherein
the row electrode drive circuit is provided with a row electrode scanning signal generating section which generates as the row electrode scanning signal a signal having a coordinate detection pulse for inducing an induction voltage at the electrode of the electronic pen in a specified time different from a time when an induction voltage is induced at the electrode of the electronic pen due to the column electrode drive signal applied to the column electrodes and an image display pulse for applying a voltage to the control terminal of each of the switching elements of the display panel.

20. A display-integrated type tablet device as claimed in claim 19, wherein
the row electrode scanning signal generating section of the row electrode drive circuit is provided with shift means for shifting pulses of shift data which serves as the display control signal input from the display control circuit and successively outputting the image display pulse, and gate means for interrupting a part of the image display pulse output from the shift means for a specified period so as to generate the coordinate detection pulse in the specified time
to generate the row electrode scanning signal in which the coordinate detection pulse composed of a slit having a specified width is inserted in the image display pulse.

21. A display-integrated type tablet device as claimed in claim 19, wherein
the row electrode scanning signal generating section of the row electrode drive circuit is provided with first shift means for shifting pulses of a first shift data signal which serves as the display control signal input from the display control circuit and successively outputting the image display pulse, and second shift means for shifting pulses of a second shift data signal which serves as the display control signal input from the display control circuit in accordance with a specified timing and successively outputting the coordinate detection pulse
to generate the row electrode scanning signal in which the coordinate detection pulse is separated from the image display pulse.

22. A display-integrated type tablet device as claimed in claim 19, wherein
the row electrode scanning signal generating section of the row electrode drive circuit is provided with shift means for shifting pulses of a shift data signal which serves as the display control signal input from the display control circuit in accordance with a specified timing and successively outputting the image display pulse
to generate the row electrode scanning signal in which the coordinate detection pulse and the image display pulse are continuous to each other.

23. A display-integrated type tablet device as claimed in claim 19, wherein
the coordinate detection circuit is constructed so as to extract a signal from a voltage signal output from the electrode of the electronic pen within a period including a rise time or fall time of the coordinate detection pulse in detecting the y-coordinate at the tip end of the electronic pen in the image display period and execute coordinate detection based on the extracted voltage signal.

24. A method for driving a display-integrated type tablet device having an active matrix type display panel having a plurality of row electrodes arranged in parallel on a transparent substrate and a plurality of column electrodes which cross the row electrodes at right angles on the transparent substrate, and a plurality of switching elements which are arranged in a position where both the electrodes cross each other on the transparent substrate and have control terminals connected to the row electrodes and input terminals connected to the column electrodes, pixel electrodes arranged on the transparent substrate and connected to output terminals of all the switching elements, and an electrode on a substrate arranged opposite to the pixel electrodes with interposition of an electro-optical material layer; an electronic pen having at a tip end an electrode electrostatically coupled with the row electrodes and the column electrodes of the display panel; a display control circuit which outputs a display control signal and display data; a detection control circuit which outputs a scanning control signal; a row electrode drive circuit which generates a row electrode scanning signal in the image display period based on the display control signal; a column electrode drive circuit which generates a column electrode drive signal in the image display period based on the display control signal and the display data, and generates a column electrode scanning signal in the x-coordinate detection period based on the scanning control signal; and a coordinate detection circuit which detects a y-coordinate at the tip end of the electronic pen in the image display period based on a voltage induced at an electrode of the electronic pen due to the row electrode scanning signal input to each of the row electrodes, and detects an x-coordinate at the tip end of the electronic pen in the x-coordinate detection period based on a voltage induced at the electrode of the electronic pen due to the column electrode scanning signal input to each of the column electrodes, the method including in the image display period the steps of successively inputting the row electrode scanning signal generated based on the display control signal to the row electrodes of the active matrix type display panel to scan the row electrodes, inputting the column electrode drive signal generated based on the display control signal and the display data to the column electrodes of the display panel to display an image on the display panel, and detecting the y-coordinate at the tip end of the electronic pen based on a voltage induced at the electrode of the electronic pen due to the row electrode scanning signal input to each of the row electrodes, and including in the x-coordinate detection period the steps of successively inputting the column electrode scanning signal generated based on the scanning control signal to the column electrodes of the display panel to scan the column electrodes and detecting the x-coordinate at the tip end of the electronic pen based on a voltage induced at the electrode of the electronic pen due to the column electrode scanning signal input to each of the column electrodes, wherein
the row electrode scanning signal successively input to the row electrodes in scanning the row electrodes of the display panel is a row electrode scanning signal including a coordinate detection pulse for inducing an induction voltage at the electrode of the electronic pen in a specified time different from a time when an induction voltage is induced at the electrode of the electronic pen due to the column electrode drive signal applied to the column electrodes and an image display pulse for applying a voltage to the control terminal of the switching element of the display panel.

25. A method for driving a display-integrated type tablet device as claimed in claim 24, wherein
the coordinate detection pulse of the row electrode scanning signal is comprised of a slit having a specified width formed in the image display pulse.

26. A method for driving a display-integrated type tablet device as claimed in claim 24, wherein
the coordinate detection pulse of the row electrode scanning signal is separated from of the image display pulse.

27. A method for driving a display-integrated type tablet device as claimed in claim 24, wherein
the coordinate detection pulse of the row electrode scanning signal is continuous to the image display pulse.

* * * * *